(12) United States Patent
Nishimura et al.

(10) Patent No.: US 6,501,909 B1
(45) Date of Patent: Dec. 31, 2002

(54) CAMERA HAVING A VARI-FOCAL LENS APPARATUS

(76) Inventors: Takashi Nishimura, 4-9-6 Arima, Miyamae-ku, Kawasaki-shi, Kanagawa (JP); Yoshihiro Date, c/o S.I.T. Co., Ltd. 1-37-23 Nakagawacyuo, Tsuzuki-ku, Yokohama-shi, Kanagawa (JP); Feng Ping Zhu, c/o S.I.T. Co., Ltd. 1-37-23 Nakagawacyuo, Tsuzuki-ku, Yokohama-shi, Kanagawa (JP)

( * ) Notice: Subject to any disclaimer, the term of this patent is extended or adjusted under 35 U.S.C. 154(b) by 120 days.

(21) Appl. No.: 09/610,385

(22) Filed: Jul. 5, 2000

(30) Foreign Application Priority Data

Dec. 13, 1999 (JP) ............................................. 11-353699

(51) Int. Cl.[7] ............................................... G03B 17/00
(52) U.S. Cl. ........................................... 396/74; 396/79
(58) Field of Search .............................. 396/72, 73, 74, 396/79, 82, 85; 359/396; 352/142

(56) References Cited

U.S. PATENT DOCUMENTS 5,956,187 A * 9/1999 Shintani ..................... 359/696

FOREIGN PATENT DOCUMENTS

JP        2538987        4/1997

* cited by examiner

*Primary Examiner*—Russell Adams
*Assistant Examiner*—Arthur A Smith

(57) ABSTRACT

A first movable barrel is rotated and moved along an optical path by driving force of a motor. A second movable barrel is attached to the interior of the first movable barrel. The second movable barrel does not rotate, but goes straight along the optical path together with the first movable barrel. Inside the second movable barrel, is rotatably attached a lens turret in which a plurality of lenses are concentrically arranged. The lens turret is intermittently rotated in accordance with a rotation of the first movable barrel to set one of the lenses at the optical path. Each lens is set to the optical path at a position where back focus is taken into consideration, so that a focal length of a taking lens is changed. When the lens turret goes straight together with the second movable barrel without rotating, focusing is performed at the set focal length. A magnification of a viewfinder optical system is changed in association with a rotation of the lens turret.

24 Claims, 16 Drawing Sheets

CAMERA HAVING A VARI-FOCAL LENS APPARATUS

BACKGROUND OF THE INVENTION

1. Field of the Invention

The present invention relates to a taking lens apparatus for a camera, and more particularly to a vari-focal lens apparatus in which one of plural lenses is selectively set at an optical path and a focal length is changed stepwise.

2. Description of the Related Art

As to cameras in which a photographic angle of view is changeable, there are a two-focus setting camera and a zoom camera. With respect to the former, there are two systems. In one of which, any one of plural taking lenses is selected to be set at an optical path, and in the other of which, a tele conversion lens is removably disposed behind a normal lens. Meanwhile, the latter employs a zoom lens apparatus in which a focal length is successively changed. In a motor drive type, it is general to select plural focal lengths within a range from several tens to several hundreds.

Although the zoom lens apparatus successively changes the focal length, the focal lengths actually used are almost both sides (a wide-angle side and a telephoto side) and one or two points of a central portion. Recently, a simplified zoom camera is put in the market. Such camera has a zoom lens apparatus which is proper to be regarded as a vari-focal lens apparatus and in which its focal length is changed in four or five steps. The above zoom lens apparatus is called as a step-zoom-lens apparatus, and upon rotating a lens barrel, changing the focal length and focusing are alternately performed. In the step-zoom-lens apparatus, it is sufficient to architect a cam structure for moving a lens such that objective performance is achieved relative to only four or five focal lengths. Accordingly, a lens barrel and a focusing mechanism are simplified so that it is possible to decrease the cost of the camera.

However, the step-zoom-lens apparatus is the zoom lens apparatus in effect. Thus, the step-zoom-lens apparatus has a plurality of cam barrels in which a complicated cam groove for zooming is formed. For this reason, complexity of the structure can not be avoided in some extent so that there is a limitation for decreasing the cost. In order to vastly decrease the cost with secureness of necessary performance, it is required to develop a new lens apparatus which is entirely different from the conventional structure.

SUMMARY OF THE INVENTION

It is a primary object of the present invention to provide a vari-focal lens apparatus which has performance being identical with that of a step-zoom-lens apparatus, and in which its structure is simplified, a space is reduced, and a cost is vastly decreased.

It is another object of the present invention to provide a vari-focal lens apparatus in which focusing can be performed in a state that a selected focal length is kept.

It is the other object of the present invention to provide a vari-focal lens apparatus in which changing a focal length and focusing are alternately performed by moving a lens barrel.

It is the other object of the present invention to provide a vari-focal lens apparatus in which a camera body may be downsized by attaching a focal-length changing motor to a lens barrel.

In order to achieve the above and other objects, the present invention comprises a lens turret to which plural lens groups having different focal lengths are attached. The lens turret is rotatably disposed in a lens barrel moving by a predetermined stroke. This stroke of the lens barrel is divided into focusing sections and focal-length changing sections positioned between them. Each of the focal-length changing sections is set, taking account of back focus of the selected lens group. When the lens barrel passes through the focal-length changing section, the lens turret is intermittently rotated. Upon rotation of the lens turret, one of the lens groups is set at an optical path to change the focal length. In the focusing sections, the lens turret is advanced without rotating by means of a positioning member, and focusing is performed stepwise under the selected focal length.

The respective lens groups of the lens turret are arranged in accordance with the focal length so as to be located at the optical path on account of the back focus. It is preferable that the respective lens groups adopt a single construction for decreasing its cost. In order to improve aberration correction and lens performance, a lens group for correcting aberration is disposed in front of and/or behind the lens turret. The lens for correcting the aberration is commonly used relative to all lens groups of the lens turret to reduce a number of parts. The lens turret and the lens groups are integrally formed from a transparent plastic in order to decrease the cost. Incidentally, it is desirable that the lens group for correcting the aberration adopts a single construction.

A rotational center of the lens turret is shifted from the center of the lens barrel. The intermittent rotation of the lens turret is performed by a protrusion and a feed claw which are intermittently engaged with each other. The protrusion is provided on a lens holder and the feed claw is provided on the lens barrel. When the lens turret is rotated, the desired lens group approaches the optical path. At this time, however, the engagement of the feed claw and the protrusion has been already released. Thus, under this state, the lens group does not stop at a proper position. Meanwhile, the lens turret has a cam portion and is pressed by a positioning member when freed from the lens barrel. The lens turret is further rotated to correctly set the desired lens group to the optical path. Incidentally, the positioning member prevents the lens turret from rotating in vain while focusing is performed.

The lens barrel comprises a first movable barrel and a second movable barrel. The first movable barrel moves in an optical axis direction in a rotating state. The second movable barrel goes straight in the optical axis direction together with the first movable barrel without rotating. The second movable barrel holds the lens turret in a rotatable manner and is rotatably attached to the first movable barrel. By rotating the first movable barrel, the lens turret goes straight in the optical axis direction together with the second movable barrel, and is rotated at a predetermined position. The first movable barrel is rotated by a single motor to move for both of changing the focal length and focusing. The motor is attached to the second movable barrel so that light shielding for the lens barrel is secured by a simple structure. Incidentally, it is possible to use a stepping motor, a DC motor with a rotary encoder, and so forth.

The first movable barrel moves, rotating in a fixed barrel. The fixed barrel holds a cylinder cam in a rotatable manner. The cylinder cam is formed with a first cam groove and a second cam groove. The first cam groove is a succession of a straight line or a curved line, and the second cam groove has a zigzag shape. The first cam groove engages with a projection provided on the second movable barrel, and the cylinder cam is rotated by the straight movement of the second movable barrel. The second cam groove engages with a cam pin of the lens holder for keeping a movable lens of a viewfinder lens system. When the cylinder cam is rotated in association with the change of the focal length, the movable lens of the viewfinder lens system is moved stepwise to change a viewfinder magnification in accordance with the focal length of the vari-focal lens system. While focusing in the vari-focal lens system is performed, the movable lens of the viewfinder lens system is stopped so that a prescribed magnification of the viewfinder is maintained.

According to the present invention, changing the focal length is performed by intermittent rotation of the lens turret caused by movement of the lens barrel. Moreover, focusing is performed during straight movement after the intermittent rotation. Thus, in comparison with a conventional step-zoom-lens apparatus, the structure is extremely simplified. Further, the whole of the lens turret is constructed as a single unit, and the lens for correcting the aberration is commonly used for the respective lens groups of the lens turret. Therefore, the cost may be vastly decreased. In this way, it becomes possible to provide the vari-focal lens apparatus which has performance being identical with that of the step zoom apparatus, and in which the structure is simplified, a space is reduced, and the cost is vastly decreased.

Moreover, by adopting a combination of a worm and a worm wheel as a reduction gear train, a large reduction gear ratio is obtained by a small number of gears. Thus, it is possible to extremely downsize the reduction gear train. Owing to this, the motor can be built in the lens barrel so that light shielding for the lens barrel may be secured by a simple structure. Further, the whole of the camera may be downsized. Furthermore, a number of parts may be reduced.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
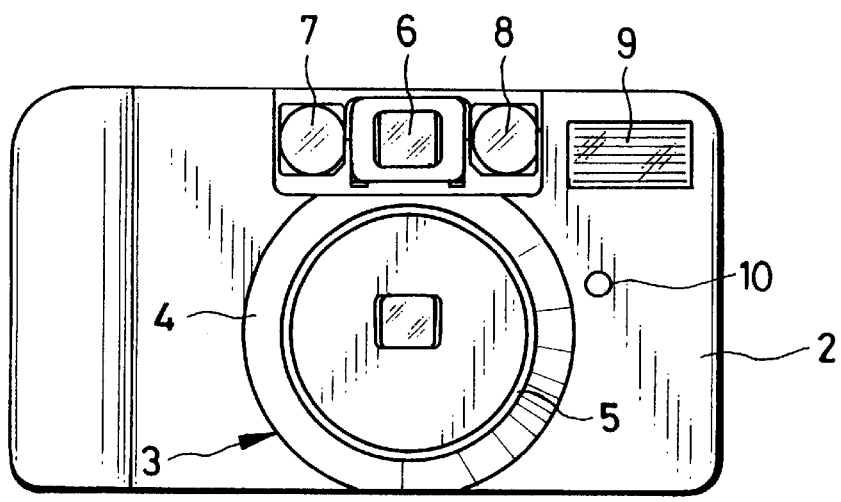
FIG. 1 is a front view of a camera having a vari-focal lens apparatus according to the present invention.

In FIG. 1, a camera body 2 is provided with a vari-focal lens apparatus 3 comprising a vari-focal lens system as a taking lens. In the vari-focal lens system, any one of plural focal lengths is capable of being set. The vari-focal lens apparatus 3 includes a fixed barrel 4 and a first movable barrel 5. The fixed barrel 4 is disposed in the camera body 2. The first movable barrel 5 is moved in an optical axis direction, rotating in the fixed barrel 4. Upon moving the first movable barrel 5 in the optical axis direction, the focal length of the vari-focal lens system is changed stepwise. Further, focusing within the respective focal lengths is also performed.

An upper portion of the camera body 2 is provided with a viewfinder window 6, a distance measurement windows 7 and 8, and a flash window 9. The distance measurement window 7 emits a near infrared beam toward a subject, and the distance measurement window 8 detects the returned infrared beam reflected by the subject. A subject distance is measured by the optical triangulation utilizing the near infrared beam. The flash window 9 emits a flash light toward the subject in association with an operation of a shutter blade when the luminance of the subject is low in an automatic flash mode and when a compulsion flash mode is set without regard to the luminance of the subject. Reference numeral 10 denotes a photometry window.

Figure 2:
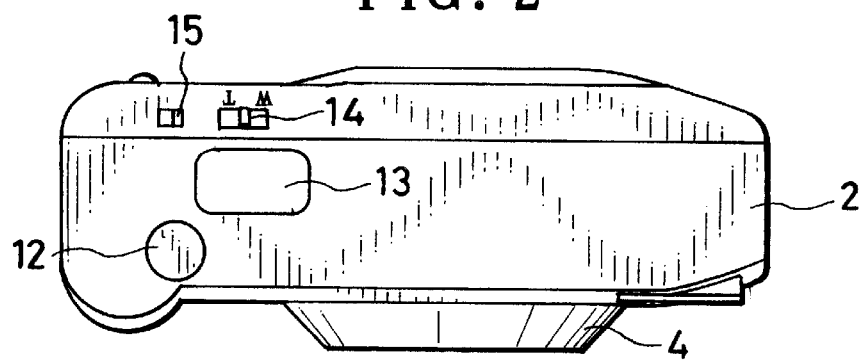
FIG. 2 is a plan view of the camera.

FIG. 2 shows the camera in a non-usage state. The first movable barrel 5 is set at a collapsible position where the movable barrel 5 is completely contained in the fixed barrel 4. A top face of the camera body 2 is provided with a release button 12 and a liquid crystal display 13. The release button 12 has a depression stroke of two steps. The liquid crystal display 13 indicates a photographic mode, a photographable frame number, a set-up focal length, warning information and so forth. A rear face of the camera body 2 is provided with a T/W switch 14 and a power supply switch 15. The T/W switch 14 is for changing the focal length of the vari-focal lens system.

Figure 3:
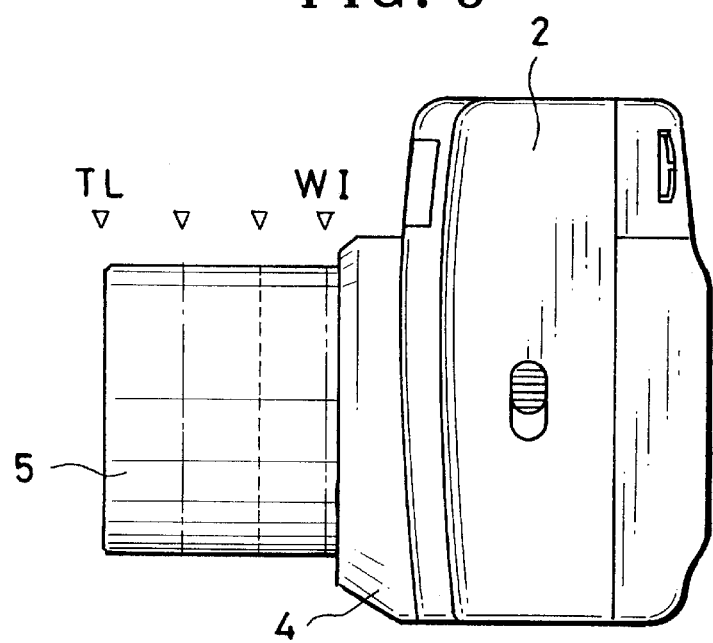
FIG. 3 is a side view of the camera.

FIG. 3 shows positions of the respective focal lengths of the first movable barrel 5. When the power supply switch 15 is turned on, the first movable barrel 5 is rotated and is moved from the collapsible position to a wide-angle position WI (shown by a two-dotted line) which is a position of the shortest focal length. When the T/W switch 14 is pushed toward a telephoto side T, the first movable barrel 5 is rotated and is advanced toward a telephoto position TL (shown by a solid line) which is a position of the longest focal length. Meanwhile, when the first movable barrel 5 is set at the telephoto position TL, the first movable barrel 5 is evacuated toward the wide-angle position WI by pushing the T/W switch 14 toward a wide-angle side W. Even if the first movable barrel 5 is located at a position of any focal length, the first movable barrel 5 is compulsorily evacuated to the collapsible position upon turning off the power supply switch 15.

In this embodiment, the focal length of the wide-angle position WI is 35 mm, and the focal length of the telephoto position TL is 70 mm. Between the wide-angle position WI and the telephoto position TL, are provided a focal-length position of 45 mm (shown by a dotted line) and a focal-length position of 56 mm (shown by one-dotted line). These focal-length positions represent home positions of the respective focal lengths. When focusing is performed, the first movable barrel 5 is advanced from the respective home positions. Thus, the vari-focal lens apparatus 3 changes the focal length of the vari-focal lens system stepwise in accordance with the movement of the first movable barrel 5. At the same time, focusing is performed in a state that the set focal length is kept.

Figure 4:
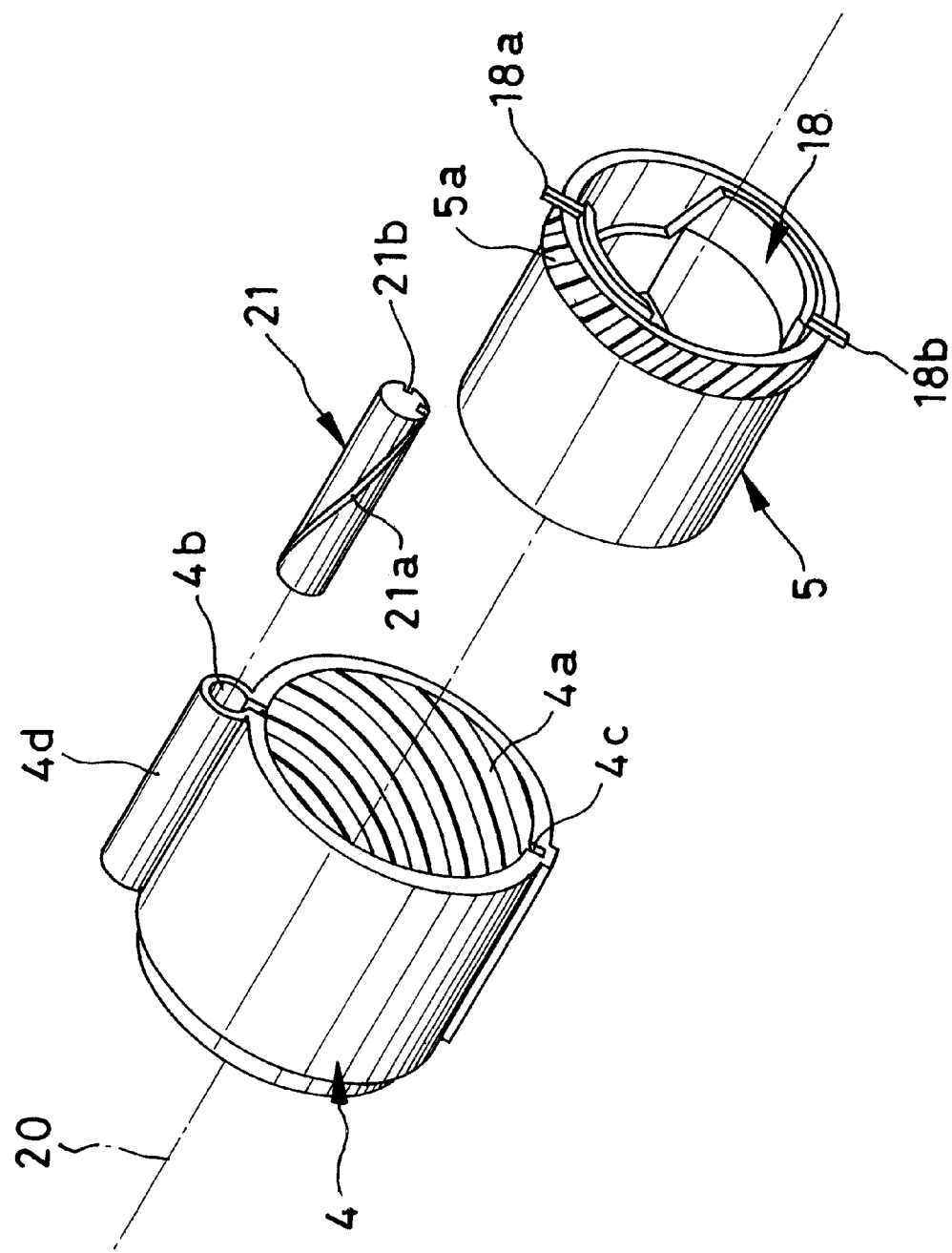
FIG. 4 is an exploded perspective view showing a fixed barrel and a first movable barrel which constitute the vari-focal lens apparatus.

In FIG. 4, a helicoid 4a is formed on the inside of the fixed barrel 4 attached to the camera body 2. The helicoid 4a is spirally engaged with a helicoid 5a formed on an outer periphery of an end edge of the first movable barrel 5. In virtue of the helicoid structure, the first movable barrel 5 is spirally moved relative to the fixed barrel 4. In other words, the first movable barrel 5 is reciprocated along an optical axis 20 with rotation. Incidentally, a rotational amount of the first movable barrel 5 does not exceed one rotation.

A second movable barrel 18 is contained in the first movable barrel 5. The second movable barrel 18 is moved along the optical axis 20 together with the first movable barrel 5, but is not rotated. In other words, the second movable barrel 18 goes straight along the optical axis 20, whereas the first movable barrel 5 is spirally moved. For this, the second movable barrel 18 is provided with projections (cam pins) 18a and 18b protruding in a radius direction. The projections 18a and 18b are engaged with straight grooves 4b and 4c of the fixed barrel 4.

The fixed barrel 4 is provided with a cam holder 4d for containing a cylinder cam 21 in a rotatable manner. The cylinder cam 21 is formed with two cam grooves 21a and 21b which do not cross with each other. The top of the projection 18a of the second movable barrel 18 is inserted into the cam groove 21a. Upon moving the second movable barrel 18 along the optical axis 20, the cylinder cam 21 is rotated. Meanwhile, the cam groove 21b is for changing a magnification of a zoom viewfinder optical system. The cylinder cam 21 changes the magnification of the viewfinder optical system in accordance with the focal length of the vari-focal lens system.

Figure 5:
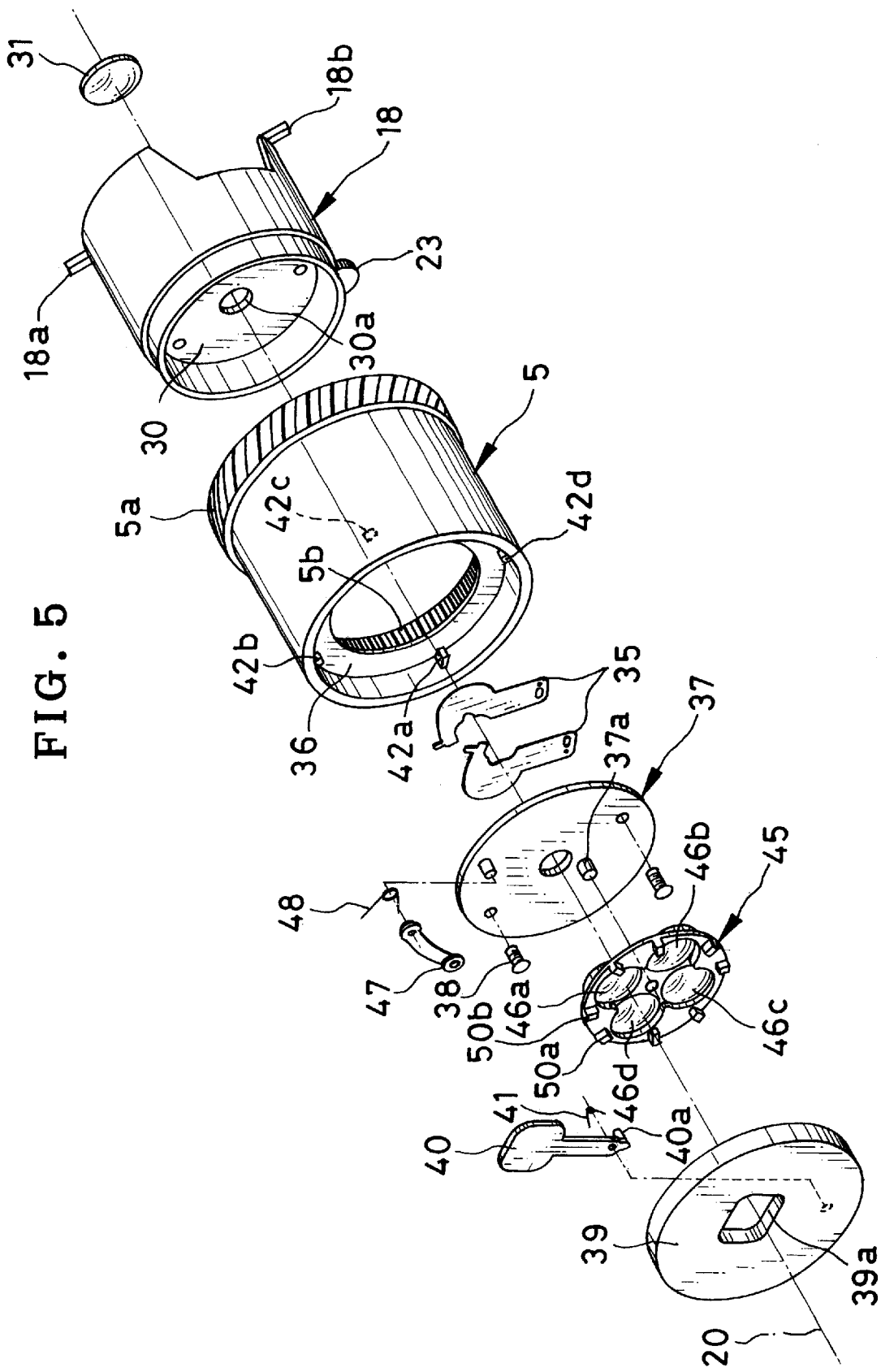
FIG. 5 is an exploded perspective view of a lens barrel.
Figure 6:
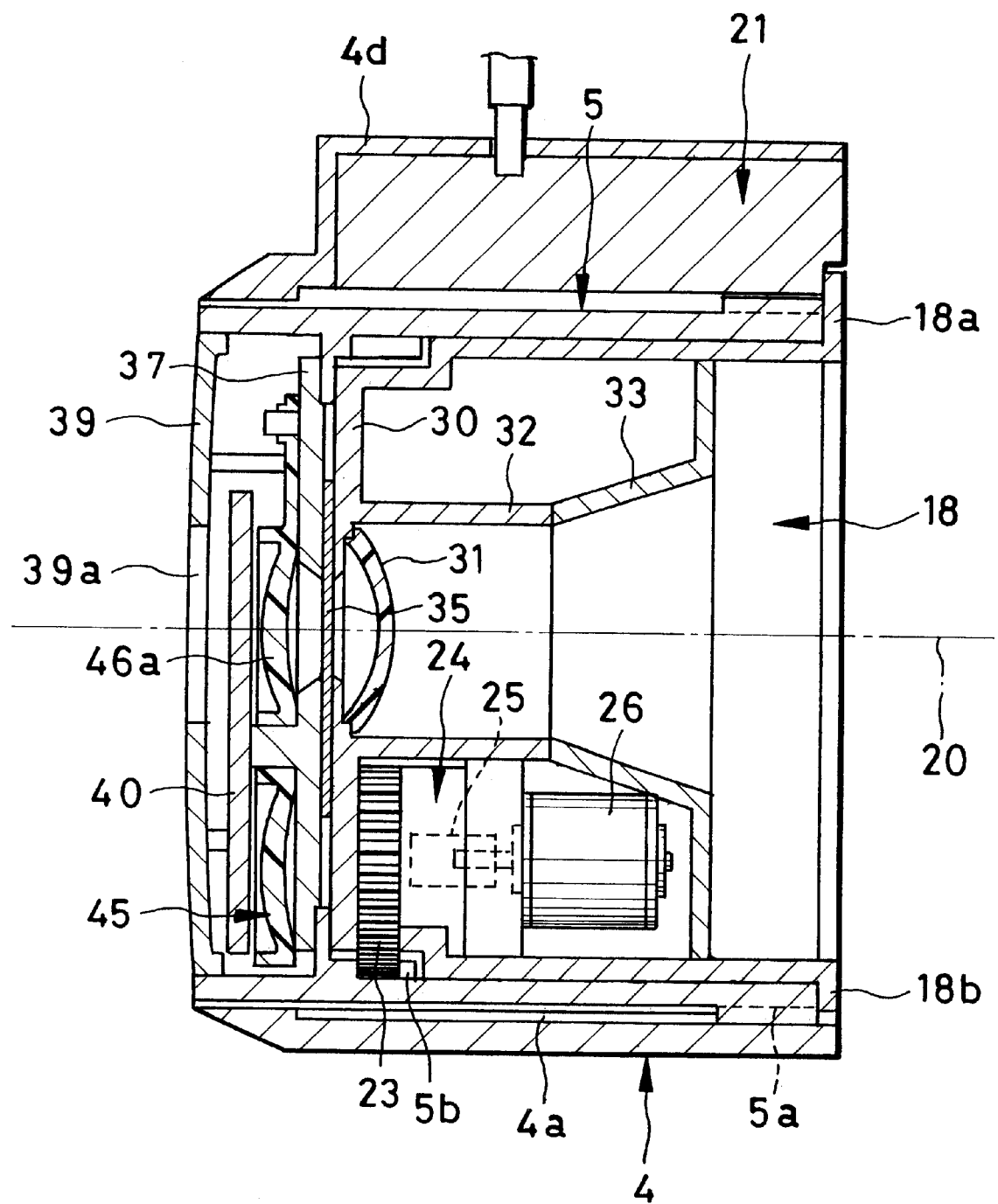
FIG. 6 is a section view of the lens barrel set at a collapsible position.
Figure 7:
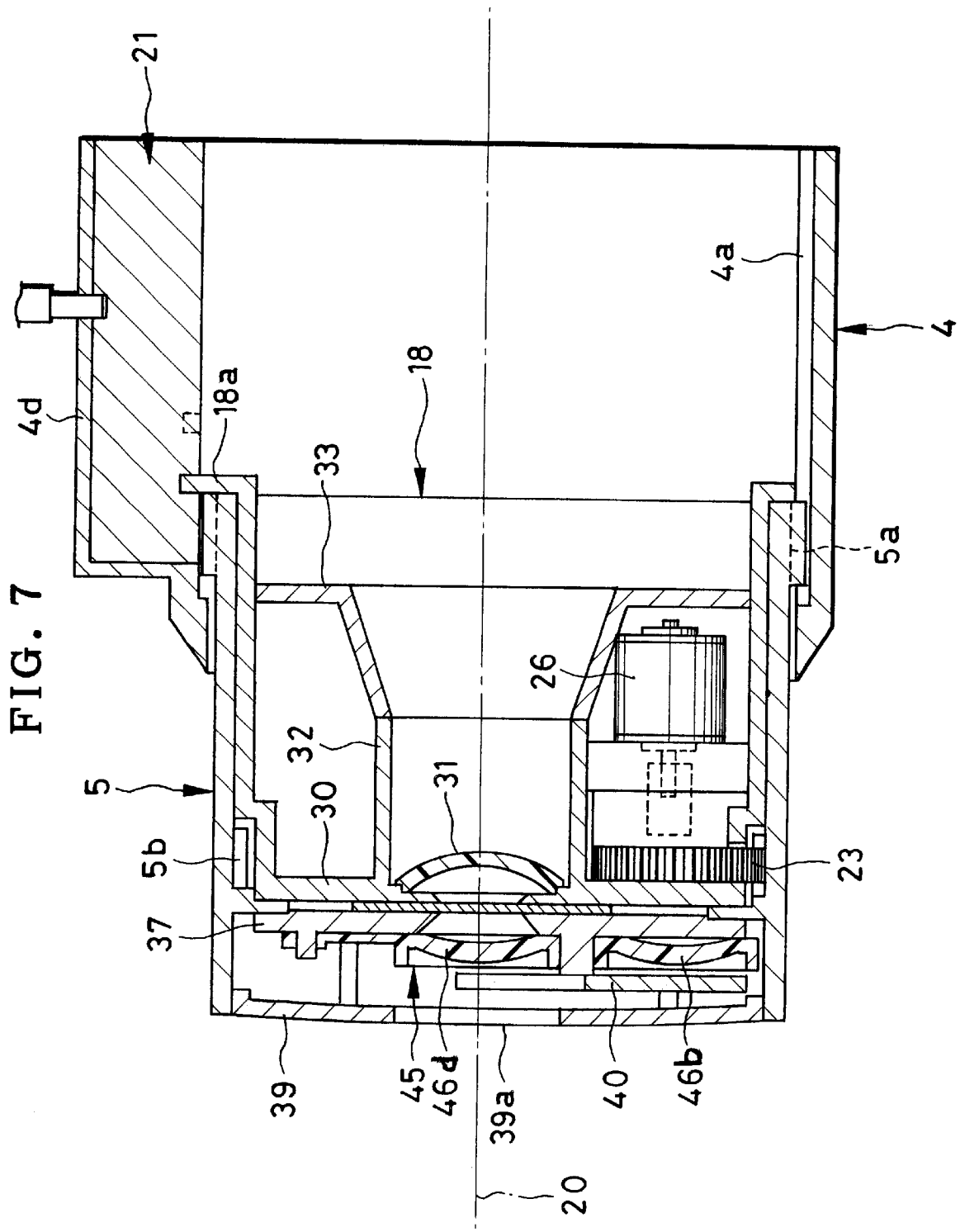
FIG. 7 is a section view of the lens barrel set at a telephoto position.

In FIGS. 5 through 7, the inside of the first movable barrel 5 is provided with an inner gear 5b meshing with a gear 23 provided on the second movable barrel 18. The gear 23 constitutes an output gear of a reduction gear unit 24. An input gear (worm wheel) of the reduction gear unit 24 meshes with a worm 25 fixed to an output shaft of a zoom motor 26. As to the zoom motor 26, a stepping motor is used, rotational force of which is transmitted to the inner gear 5b via the reduction gear unit 24. Consequently, the first movable barrel 5 is rotated and is moved in the optical axis direction in the fixed barrel 4. The reduction gear unit 24 and the zoom motor 26 are attached to the interior of the second movable barrel 18.

By the way, it is technically well known that the zoom motor is attached to the interior of the camera body. The present invention is based on an entirely new idea that the zoom motor 26 is attached to the lens barrel itself being as a moving object. In order to realize such structure, the combination of the worm 25 and the worm wheel is adopted as a reduction gear train to obtain a large reduction gear ratio with a few gears. In virtue of this, the reduction gear unit 24 may be vastly downsized so that it becomes possible to provide the zoom motor 26 in the second movable barrel 18. Hence, light shielding for the lens barrel is secured by a simple structure. Further, the camera may be downsized and a number of its parts may be reduced.

A leading side of the second movable barrel 18 is provided with a partition 30 so as to divide the interior thereof into two portions. The center of the partition 30 is formed with an orifice 30a, to the back of which a rear lens group 31 is attached. The rear lens group 31 is a single meniscus lens, and in this embodiment, a concave face thereof faces the front side. Further, a light-shielding barrel 32 is integrally attached to the second movable barrel 18 so as to surround the rear lens group 31. The light-shielding barrel 32 is connected to a hood 33 for guiding the light having passed through the rear lens group 31 to an exposure aperture (not shown) provided in the camera body 2. Two shutter blades 35 are attached to the front of the partition 30 to open and close the orifice (shutter opening) 30a.

A leading side of the first movable barrel 5 is provided with a flange 36. A lens base 37 is superimposed on the front of the flange 36, and is fixed to the partition 30 by screws 38. The lens base 37 and the partition 30 catch the flange 36 so that the lens base 37 goes straight in the optical axis direction together with the first movable barrel 5 without disturbing the rotation of the first movable barrel 5.

A decorative cover 39 for covering the first movable barrel 5 is fixed to the lens base 37 and is fitted into an edge portion of the first movable barrel 5 so as not to disturb the rotation thereof. The center of the decorative cover 39 is formed with an orifice 39a through which the photographic light passes.

A lens cover 40 is attached to the back of the decorative cover 39. The lens cover 40 is urged by a spring 41 in a direction for opening the orifice 39a. When the first movable barrel 5 is evacuated from the wide-angle position WI to the collapsible position, a feed claw 42a of the first movable barrel 5 pushes an engaging member 40a of the lens cover 40 during the rotation of the first movable barrel 5. Thus, the lens cover 40 is moved from an open position to a closed position to close the orifice 39a. In contrast, when the first movable barrel 5 is moved from the collapsible position to the wide-angle position WI, the lens cover 40 is moved toward the open position by the spring 41.

A lens turret 45 is rotatably attached to a shaft 37a of the lens base 37. The lens turret 45 is provided with four front lens groups 46a–46d which have different focal lengths and are concentrically arranged at 90-degree intervals. The shaft 37a for retaining the lens turret 45 is positioned so as to be separated from the optical axis 20. Thus, in accordance with a rotation of the lens turret 45, the centers of the respective front lens groups 46a–46d are disposed, by turn, at a position coinciding with the optical axis 20. Incidentally, when the optical axis 20 is separated from the center of the first movable barrel 5, the rotational center of the lens turret 45 may coincide with the center of the first movable barrel 5.

The first movable barrel 5 is provided with four feed claws 42a–42d arranged in 90-degree intervals and protruding in a radius direction. By the four feed claws 42a–42d, the lens turret 45 is rotated every predetermined rotation of the first movable barrel 5. Incidentally, the lens turret 45 and the first movable barrel 5 do not rotate exceed one rotation. The feed claw 42a has a long width in the optical axis direction so that it is possible to abut on the engaging member 40a of the lens cover 40. The other feed claws 42b–42d have short widths so that these claws do not abut on the engaging member 40a. Meanwhile, the lens base 37 is provided with a positioning lever 47 for setting a position of the lens turret 45. The positioning lever 47 is urged toward the lens turret 45 by means of a spring 48.

Figure 8:
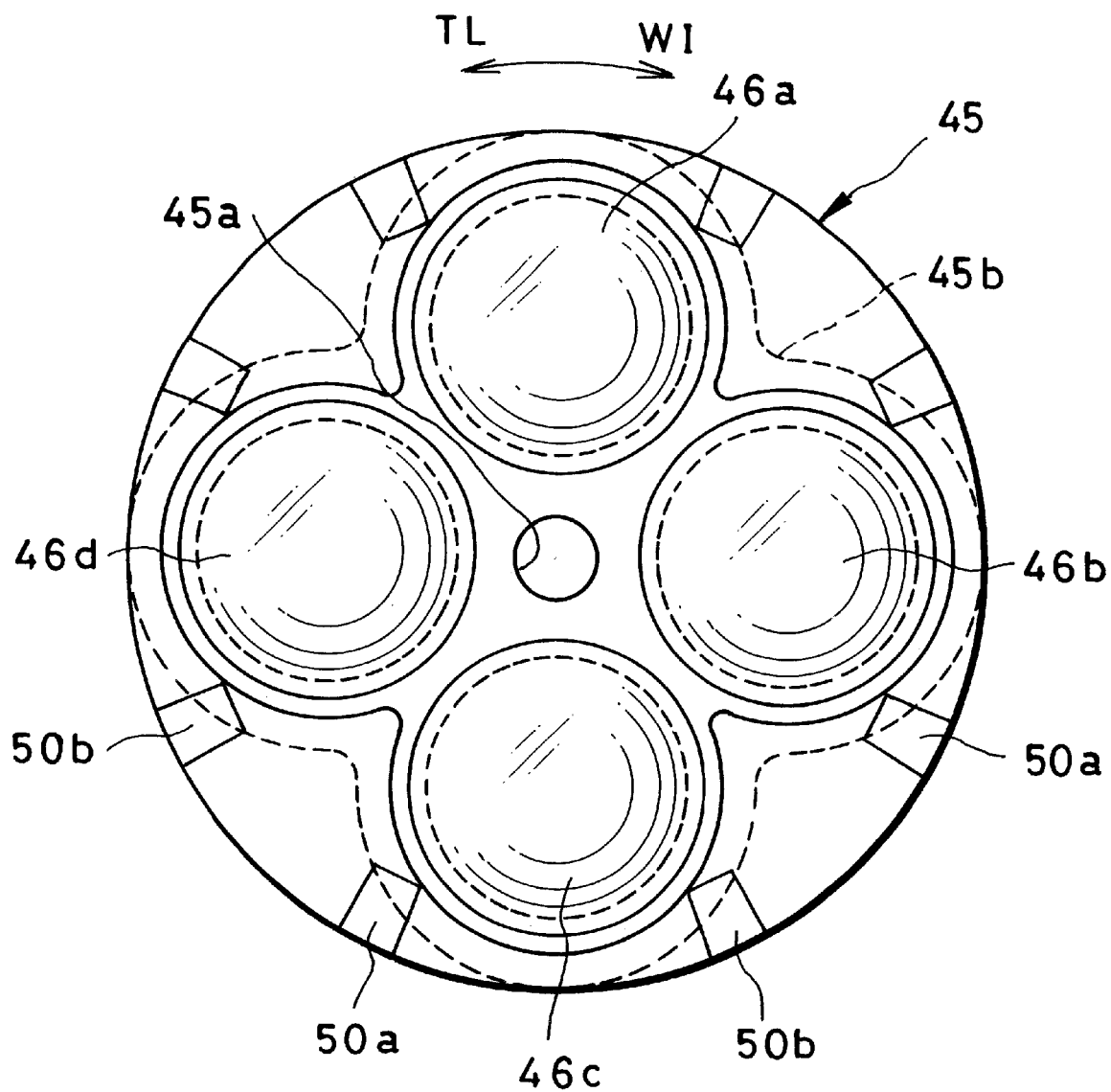
FIG. 8 is a front view of a lens turret.

Such as minutely shown in FIG. 8, the center of the lens turret 45 is provided with a shaft hole 45a into which the shaft 37a is rotatably fitted. Moreover, the back of the lens turret 45 is provided with a cam portion 45b for positioning. Further, the front of the of the lens turret 45 is provided with four projection pairs, each of which is disposed between the adjacent two front lens groups. The projection pair has two projections 50a and 50b. When the first movable barrel 5 is advanced toward the telephoto position TL, the projection 50a is pushed by any one of the feed claws 42a–42d to rotate the lens turret 45 in a counterclockwise direction. In contrast, when the first movable barrel 5 is returned toward the wide-angle position WI, the projection 50b is pushed by any one of the feed claws 42a–42d to rotate the lens turret 45 in a clockwise direction. In other words, when any one of the feed claws 42a–42d engages with either of the projections 50a and 50b, the lens turret 45 is rotated in association with the first movable barrel 5 to change the front lens group. When the feed claws 42a–42d do not engage with the projections 50a and 50b, the lens turret 45 is free from the first movable barrel 5.

Figure 9:
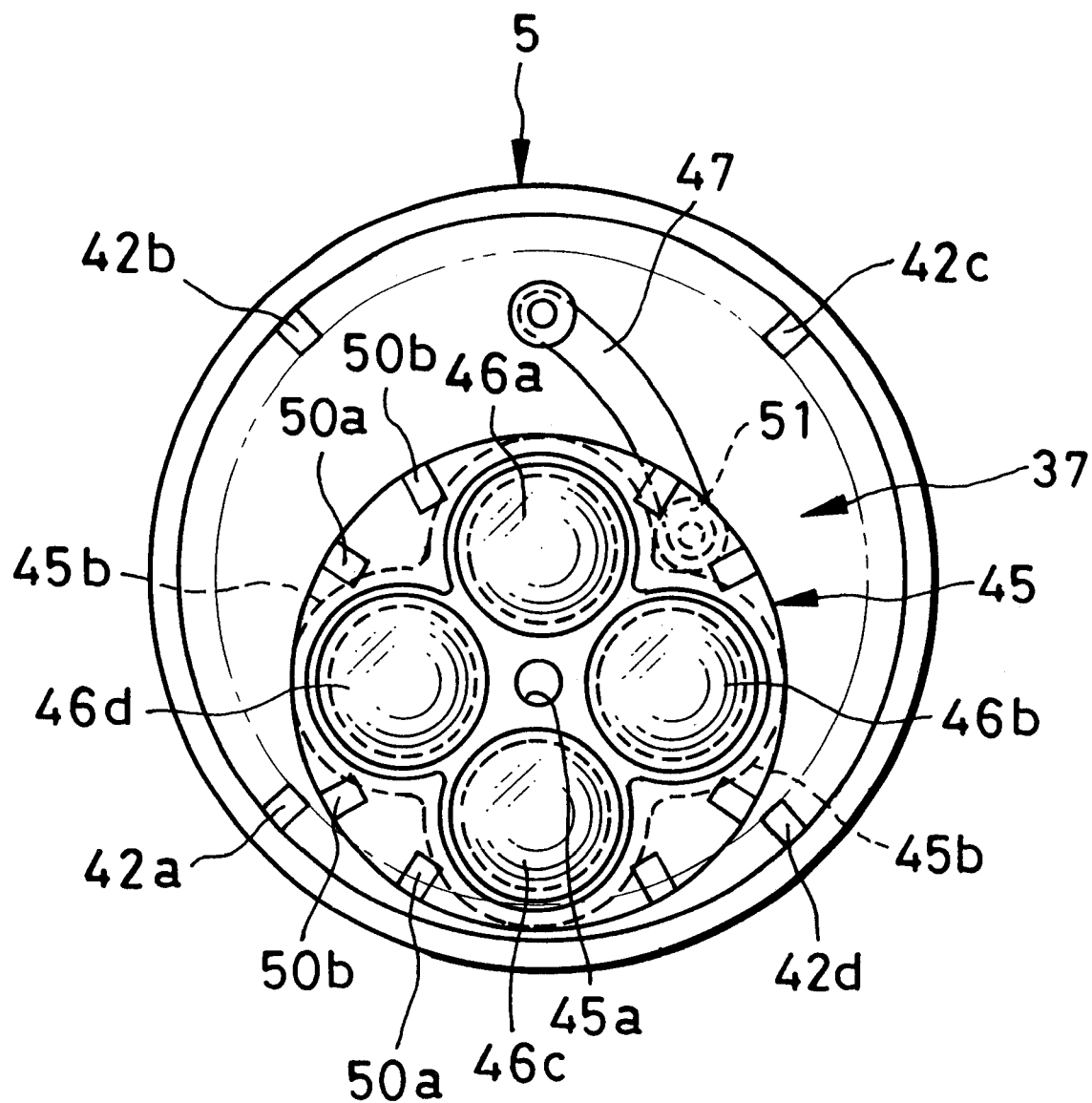
FIG. 9 is a front view showing a relationship between the first movable barrel and the lens turret.
Figure 10:
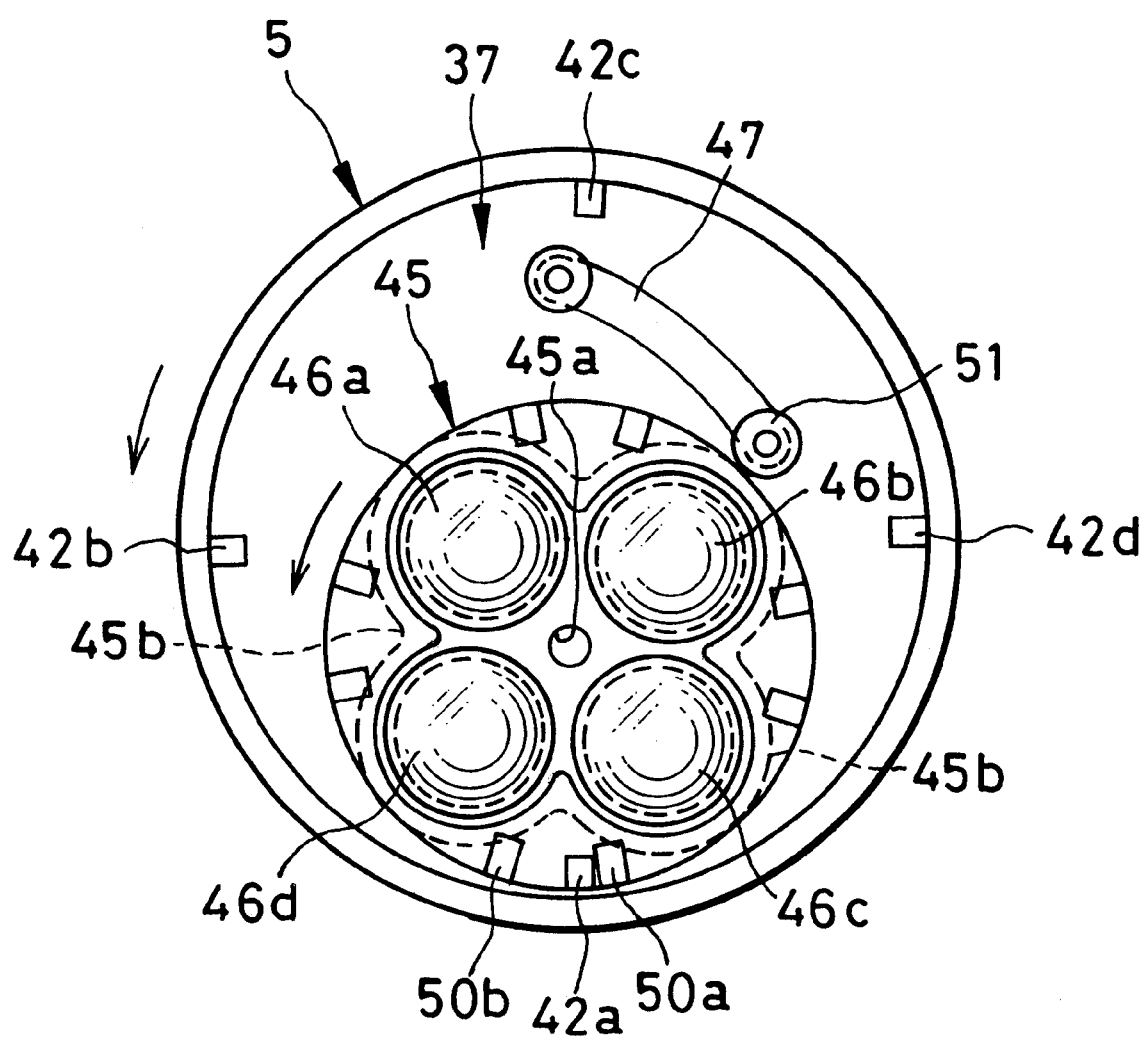
FIG. 10 is a view being similar to FIG. 9 and showing a change of the lens turret.

Such as shown in FIG. 9, a roller 51 is attached to the top of the positioning lever 47. The roller 51 is pressed against the cam portion 45b of the lens turret 45 by the spring 48 for urging the positioning lever 47. When the lens turret 45 is rotated by the first movable barrel 5, the roller 51 is slipped out of a concave of the cam portion 45. Then, such as shown in FIG. 10, the roller 51 rolls along an arc section of the cam portion 45. The roller 51 attempts to enter the concave of the cam portion 45b after passing through the apex of the arc section so that rotational force is given to the lens turret 45. When the lens turret 45 becomes free, it is rotated by the roller 51. After the roller 51 has entered the concave of the cam portion 45b, the lens turret 45 is stopped to rotate and is kept in the present position, such as shown in FIG. 9. In this state, any one of the front lens groups 46a–46d is selected and the center thereof coincides with the optical axis 20.

The front lens groups 46a–46d have the different focal lengths respectively, and are arranged on the lens turret 45 in order of the focal lengths. The front lens group 46a has the shortest focal length and the front lens group 46d has the longest focal length. When the front lens groups 46a–46d are set to the optical axis 20 by turn, the front lens groups 46a–46d secure the prescribed back focus. Although the respective front lens groups 46a–46d are constructed by a single lens, they may be constructed by two or three lenses, further, they may be aspherical lenses. The vari-focal lens system having the four-step focal lengths is constituted of the front lens groups 46a–46d and the rear lens group 31.

Figure 11:
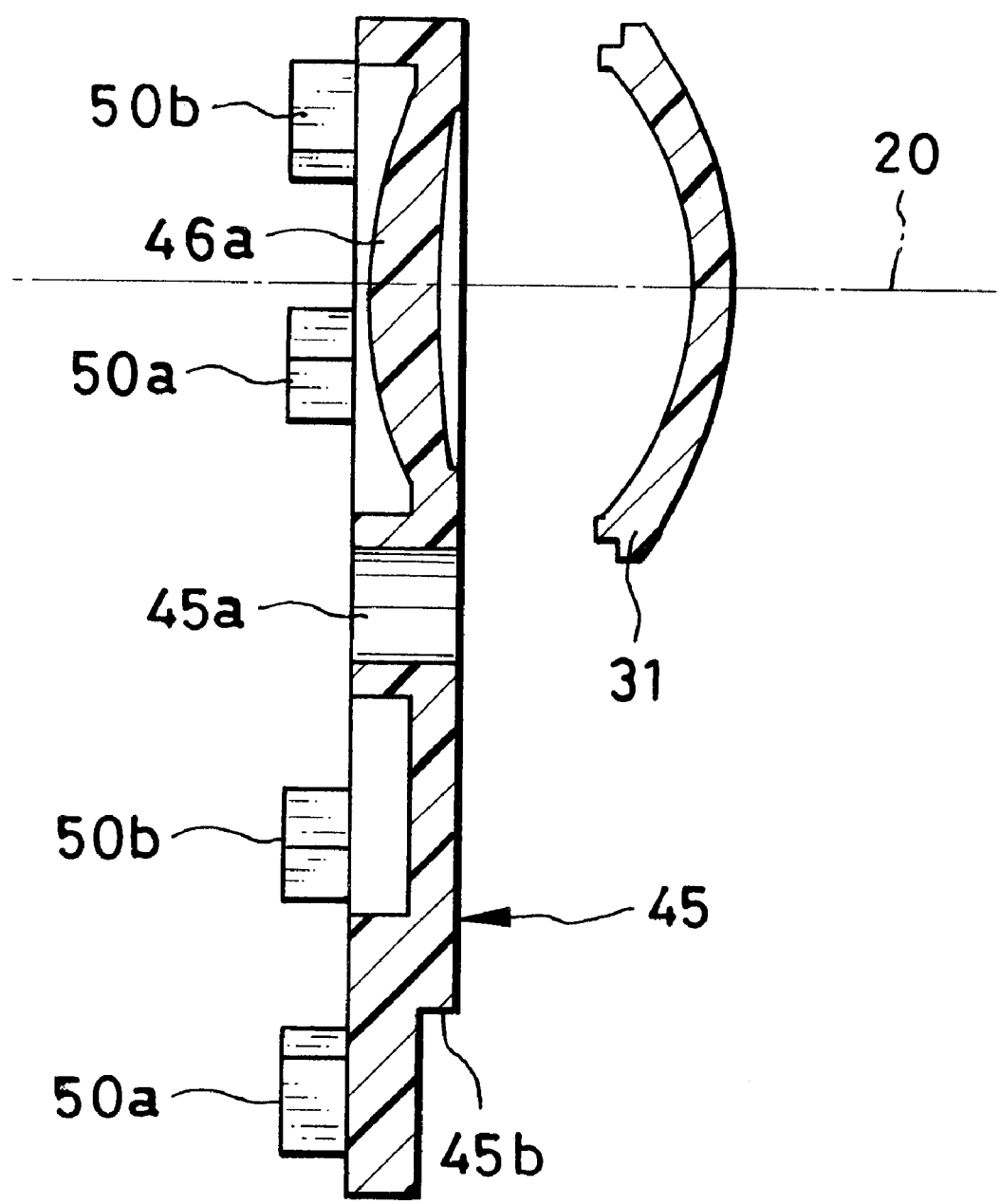
FIG. 11 is a section view showing a vari-focal lens system.

The four front lens groups 46a–46d are separately formed and are respectively fitted to the lens turret 45. Otherwise, the front lens groups 46a–46d may be integrally formed. In case the four front lens groups 46a–46d are integrally formed as a lens board, the cost for manufacturing and assembling may be decreased. Moreover, such as shown in FIG. 11, it is desirable to integrally form the four front lens groups 46a–46b and the lens turret 45 as a single piece. In case the front lens groups 467a–46d and the lens turret 45 are formed as one piece, a transparent plastic is used as a material.

Figure 12:
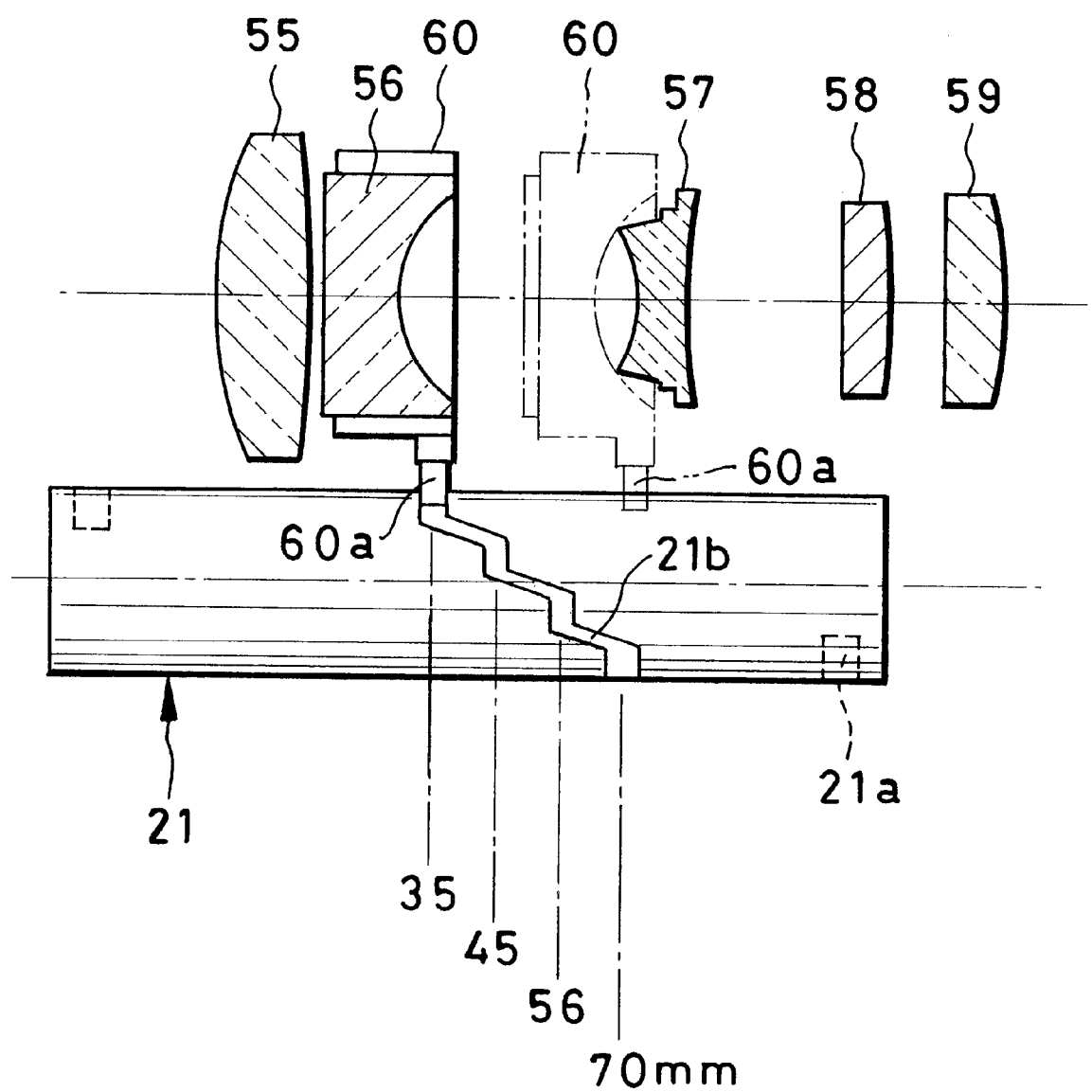
FIG. 12 is an illustration showing an optical system of a step zoom viewfinder.
Figure 13:
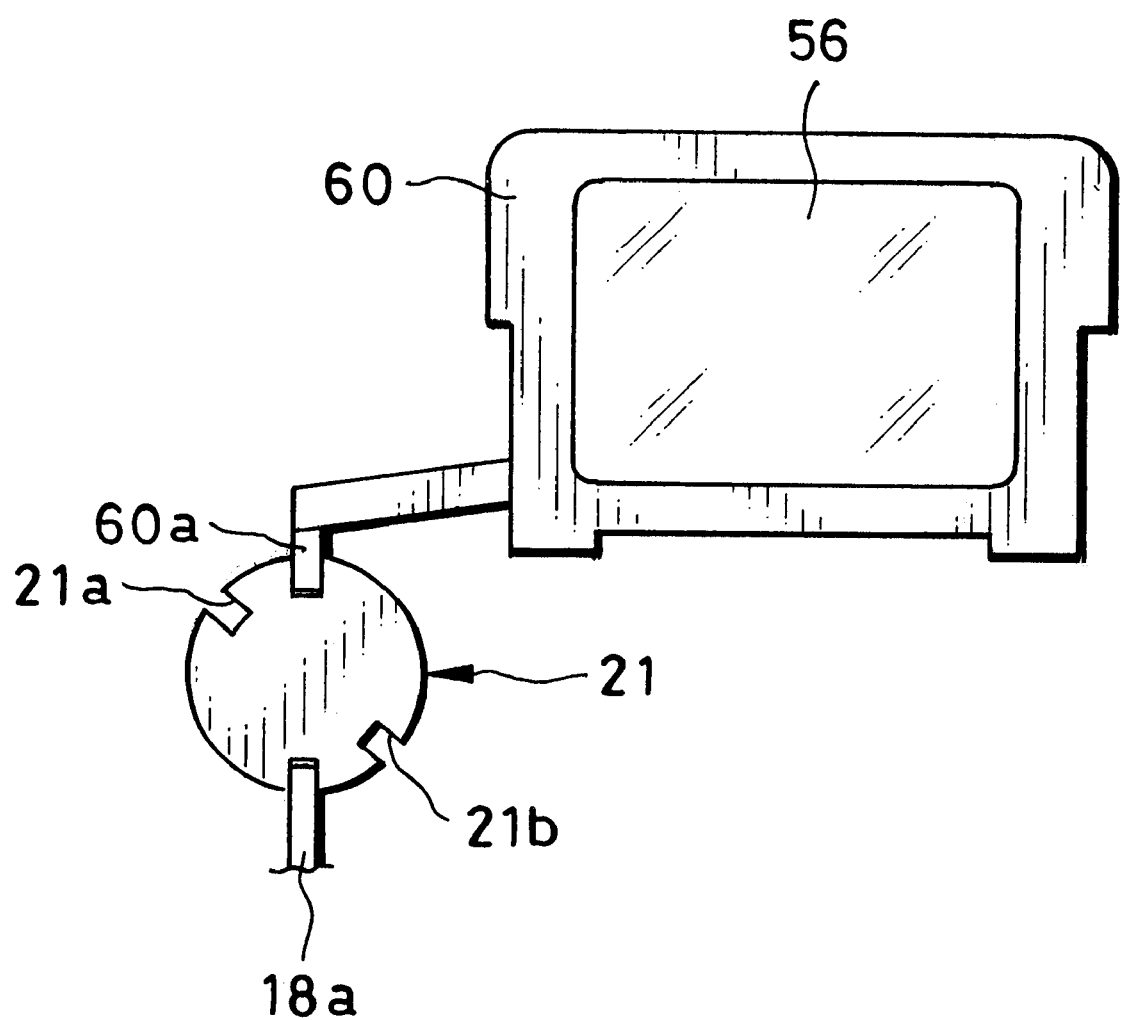
FIG. 13 is an explanatory illustration showing a relationship between a cylinder cam and a lens holder.

FIGS. 12 and 13 show the step zoom viewfinder disposed behind the viewfinder window 6. The step zoom viewfinder changes the magnification of the viewfinder in four steps corresponding to the selected four focal lengths of the vari-focal lens system. In virtue of this, a photographic angle of view of the vari-focal lens system corresponds to an angle of a visual field of the step zoom viewfinder. The step zoom viewfinder is constituted of a first lens group 55 through a fifth lens group 59 arranged in order from a subject side. The first lens group 55 and the third through fifth lens groups 57–59 are fixed. However, the second lens group 56 is moved so that the magnification of the viewfinder is changed. The second lens group 56 is held by a lens holder 60. This lens holder 60 is guided by a straight groove (not shown) extending in the optical axis direction of the step zoom viewfinder to straightly move between positions shown by a solid line and a two-dotted line. At the position shown by the two-dotted line, the third lens group 57 enters the lens holder 60.

The lens holder 60 is provided with a cam pin 60a fitted into the cam groove 21b of the cylinder cam 21. When the second movable barrel 18 is moved in the optical axis direction due to a combination of the cam groove 21a and the projection 18a of the second movable barrel 18, the cylinder cam 21 is rotated in the cam holder 4d (see FIG. 4). Upon rotation of the cylinder cam 21, the lens holder 60 is moved in accordance with a shape of the cam groove 21b.

The cam groove 21b comprises four pause sections extending in a circumferential direction, and three slanted sections connecting these pause sections. The cam groove 21b has a zigzag shape as a whole. When the cam pin 60a enters the four pause sections, the lens holder 60 is not moved in the optical axis direction even if the cylinder cam 21 is rotated. Thus, the magnification of the viewfinder is not changed. Focusing in the vari-focal lens system is performed by moving the lens turret 45 in the optical axis direction together with the second movable barrel 18 in a state that the rotation of the lens turret 45 is stopped. While focusing in the vari-focal lens system is performed, the cam pin 60a enters the pause section so as not to change the magnification of the viewfinder. In FIG. 12, values (35 mm, 45 mm, 56 mm and 70 mm) of the respective focal lengths of the vari-focal lens system are written so as to correspond to the respective pause sections.

Figure 14:
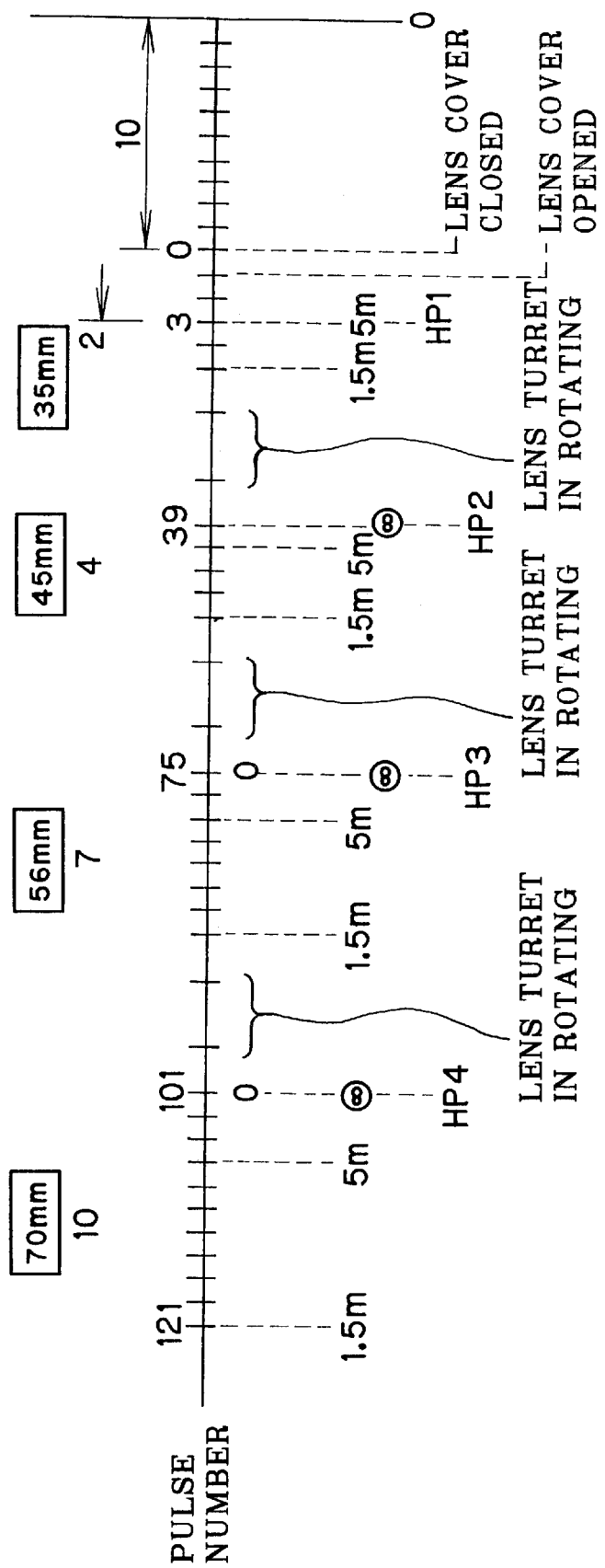
FIG. 14 is an explanatory illustration showing a forward step of the lens barrel.

When the lens turret 45 is rotated to change the focal length of the vari-focal lens system, the cam pin 60a enters any one of the three slanted sections. After the cam pin 60a has entered the slanted section, the lens holder 60 is moved in the optical axis direction by rotating the cylinder cam 21. Then, the cam pin 60a enters the next pause section so that the magnification of the viewfinder is changed. FIG. 14 shows pulse numbers (step numbers) representing rotational positions of the zoom motor 26, the respective focal lengths of the vari-focal lens system, and subject distances being set at the respective focal lengths. In this embodiment, the focal lengths are 35 mm, 45 mm, 56 mm and 70 mm. The front lens group 46a is used when the focal length is 35 mm, and the front lens group 46b is used when the focal length is 45 mm. The front lens group 46c is used when the focal length is 56 mm, and the front lens group 46d is used when the focal length is 70 mm.

The rotational position of the zoom motor 26 corresponds to the position of the first movable barrel 5 (rotational position or straight position) and the position of the second movable barrel 18 (straight position). Thus, FIG. 14 represents a rotation or a straight stroke of the lens barrel as well. A region expressed as "lens turret in rotating" is a section for changing the focal length during the stroke. There are focusing sections succeeding to the sections for changing the respective focal lengths. In this section, the lens turret goes straight in the optical axis direction without rotating. A numeral written within the focusing section represents a value of the set focal length being. Incidentally, a numeral written under the value of each focal length represents a step number of maximum movement in focusing.

Next, an operation of the vari-focal lens apparatus 3 is described below. When the power supply switch 15 is in an off-state, the first movable barrel 5 is contained in the fixed barrel 4 and the lens cover 40 closes the orifice 39a of the decorative cover 39, such as shown in FIG. 2. When the power supply switch 15 is turned on, the zoom motor 26 built in the second movable barrel 18 is rotated. Rotational power of the zoom motor 26 is transmitted to the inner gear 5b of the first movable barrel 5 via the output gear 23 of the reduction gear unit 24. At this time, the second movable barrel 18 for giving the rotational force receives opposite rotational force relative to the first movable barrel 5 owing to reaction. However, the projections 18a and 18b provided on the second movable barrel 18 are fitted to the straight grooves 4b and 4c provided in the fixed barrel 4 so that the second movable barrel 18 is prevented from being rotated by the reaction.

The helicoid 5a of the first movable barrel 5 meshes with the helicoid 4a of the fixed barrel 4. Thus, the first movable barrel 5 receiving the rotational force is advanced in the rotating state. When the first movable barrel 5 is advanced with rotation, the second movable barrel 18 is advanced together with the first movable barrel 5 in a state that its rotation is prevented. Incidentally, when it is unnecessary for explanation to discriminate the spiral movement of the first movable barrel 5 and the straight movement of the second movable barrel 18, the movement of the two movable barrels 5 and 18 is dealt with as the movement of the lens barrel.

Upon rotation of the first movable barrel 5, the feed claw 42a is separated from the engaging member 40a of the lens cover 40 so that the lens cover 40 is moved to the open position by the spring 41 to open the orifice 39a of the decorative cover 39. While the first movable barrel 5 is moved from the collapsible position to the wide-angle position WI shown in FIG. 3, the feed claw 42a of the first movable barrel 5 does not engage with the projection 50a. Thus, the lens turret 45 is not rotated so that the front lens group 46a is kept to coincide with the optical axis 20. When the first movable barrel 5 reaches the wide-angle position WI, the zoom motor 26 is stopped. Under this state, the front lens group 46a and the rear lens group 31 constitute the vari-focal lens apparatus having the focal length of 35 mm.

In a state that the first movable barrel 5 is set at the wide-angle position WI, the lens barrel is set at a home position HP1, moreover, the focal length of the vari-focal lens system is adapted to be 35 m and the subject distance is adapted to be 5 meters. The subject distance of 5 meters at the home position HP1 is determined, taking account of a depth of field.

In the vari-focal lens system having the focal length of 35 mm, such as shown in FIG. 14, the set subject distances are three points of 5 meters, 1.5 meters and a predetermined distance between them. Since the subject distance of 5 meters is set as the home position HP1, the lens barrel may be advanced in two steps during focusing.

When the value of the subject distance measured by an automatic focusing device is nearest to 5 meters, the zoom motor 26 is not rotated and the lens barrel is kept at the home position HP1. When the value of the subject distance is nearest to 1.5 meters, the zoom motor 26 is rotated by two steps and the lens barrel is moved so as to set the subject distance of the vari-focal lens system to 1.5 meters. At this focusing time, whereas the first movable barrel 5 is rotated, the feed claw 42a does not engage with the projection 50a. Thus, the lens turret 45 goes straight along the optical axis without rotating. After the shutter blade 35 has been actuated to complete an exposure operation, the zoom motor 26 is reversed to return the lens barrel to the home position HP1.

As described above, for focusing in the state that the selected focal length is maintained, the zoom motor 26 is rotated by a certain step number between the home position and the subject distance. Owing to this, the lens barrel is further advanced and the whole of the vari-focal lens system is moved. Moreover, the roller 51 of the positioning lever 47 enters the concave of the cam portion 45b so that the lens turret 45 is kept to be stopped at the predetermined rotational position while focusing is performed.

After photographing, the zoom motor 26 is reversed to return the lens barrel to the home position of the selected focal length. Accordingly, focusing is performed on the basis of the home position. In this way, focusing is always performed by advancement from the home position. In virtue of this, looseness of components of the lens barrel may be gathered around one side. Influence of the looseness is reduced so that focusing can be performed with great accuracy.

Successively, when the focal length is set to 45 mm, the T/W switch 14 is pushed to the telephoto side T. The zoom motor 26 is rotated to advance the lens barrel. When the zoom motor 26 is rotated by three steps from the home position HP1, the feed claw 42a engages with the projection 50a such as shown in FIG. 10. When the zoom motor 26 is further rotated by one step, the feed claw 42a pushes the projection 50a so that the lens turret 45 is rotated.

When the front lens group 46b used for the focal length of 45 mm approaches the optical axis 20, the feed claw 42a is separated from the projection 50a. At this time, the roller 51 of the positioning lever 47 exceeds the top of the cam portion 45b so that the rotational force is given to the lens turret 45 by the urging force of the spring 48. The lens turret 45 is rotated until the roller 51 enters the concave of the cam portion 45b. Consequently, the front lens group 46b used for the focal length of 45 mm is set to the optical axis 20.

As to the focal length of 45 mm, the home position HP2 has the subject distance of infinity. Moreover, five subject distances including the infinity can be set. Also in this case, one of the five subject distances is selected in accordance with auto-focus information to rotate the zoom motor 26 from the home position HP2. Incidentally, the infinity of a camera is about 12 to 15 meters in fact, so it is all right to set the home position to a position where focusing is performed relative to a farther distance. This way, a view of a mountain or the like can be sharply photographed.

When the focal lengths of 56 mm and 70 mm are selected, it will be easily understood from the above description. Further, focusing in the case of each focal length is similar to the above. As the focal length becomes long, the depth of field becomes shallow. Thus, it is necessary to perform fine focusing. In view of this, as the focal length becomes long, the number of the set subject distances is adapted to be large. For example, as for the focal length of 56 mm, it is possible to perform focusing in eight steps. As for the focal length of 70 mm, it is possible to perform focusing in eleven steps.

When the focal length is set to a shorter focal length like a case in that the focal length is changed from 70 mm to 45 mm, the T/W switch 14 is pushed toward the wide-angle side W to reverse the zoom motor 26. The zoom motor 26 is rotated in revers from the home position HP4 of the focal length of 70 mm to the home position HP3 of the focal length of 45 mm to return the lens barrel.

When the power supply switch is turned off, the zoom motor 26 is reversed so that the lens barrel is evacuated to be contained in the camera body 2. At this time, since the feed claw 42$a$ pushes the engaging member 40$a$, the lens cover 40 is rotated against the spring 41 to close the orifice 39$a$ of the decorative cover 39.

Figure 15:
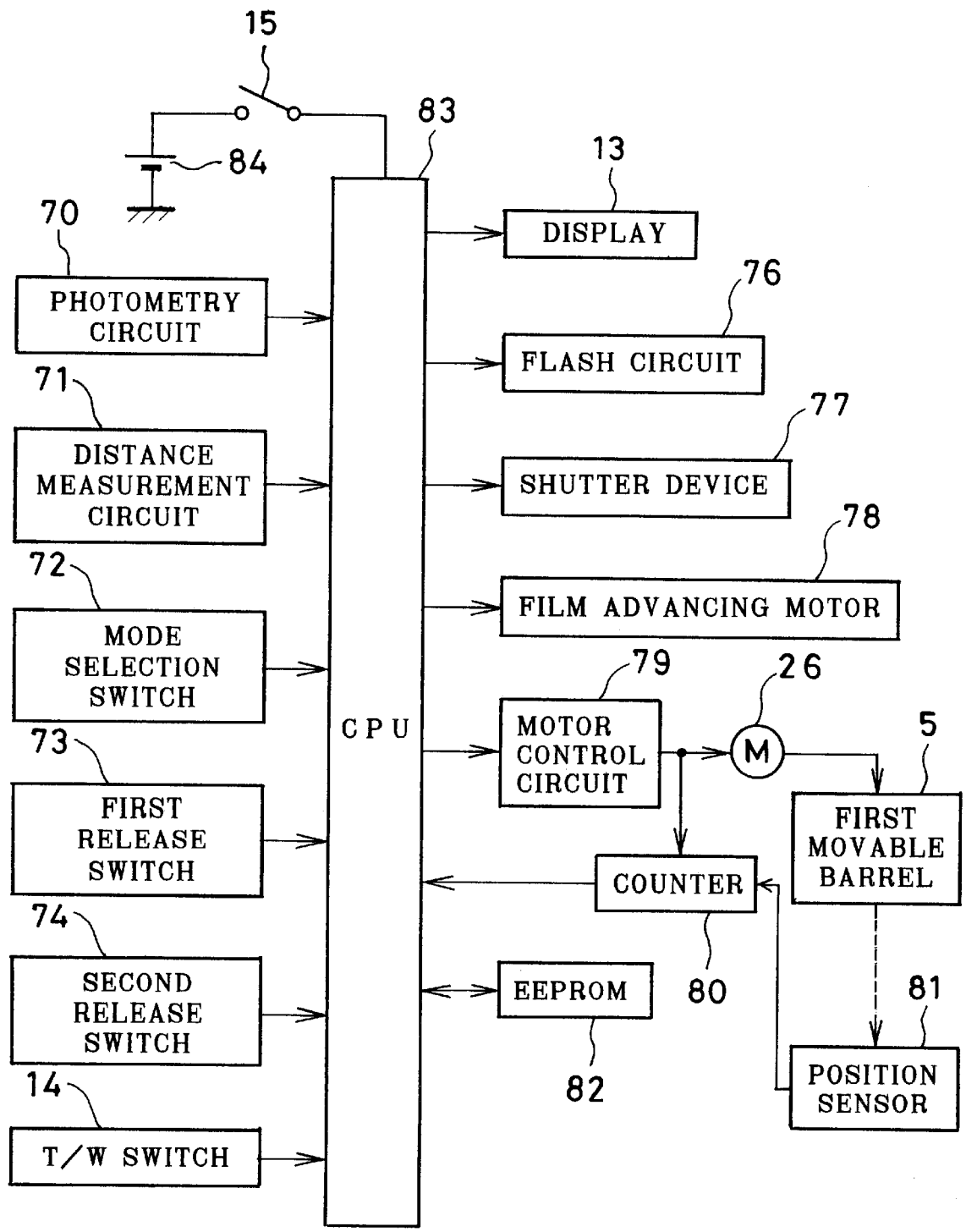
FIG. 15 is a block diagram showing an electric circuit of a camera.

FIG. 15 shows a control circuit of the camera. A photometry circuit 70 measures the light which is reflected by a subject and enters through the photometry window 10. A distance measurement circuit 71 emits the near infrared beam from the distance measurement window 7 and receives the returned near infrared beam with the distance measurement window 8. In this way, the distance measurement circuit 71 measures the subject distance. A mode selection switch 72 designates a flash mode (a compulsory flash mode, a flash prohibition mode, automatic flash mode), a red-eye prevention mode, a self-photographing mode, and so forth.

Upon half depression of the release button 12, a first release switch 73 is turned on. Upon full depression of the release button 12, a second release switch 74 is turned on. In the flash mode, a flash circuit 76 emits the flash light in association with a shutter device 77. The flash light is emitted through the flash window 9 toward the subject. After the shutter device 77 has been actuated for photographing, a film advancing motor 78 is automatically rotated to wind a photo film by one frame. When all of the frames have been exposed, the film advancing motor 78 is rotated in reverse to rewind the photo film into a cassette.

A motor control circuit 79 controls the rotation of the zoom motor 26. A counter 80 counts a drive pulse supplied to the zoom motor 26 to detect a rotational position of the zoom motor 26. Meanwhile, the closed position of the lens cover 40 is adapted to be an original position of the zoom motor 26. When a position sensor 81 detects this original position, the counter 80 is reset.

In an EEPROM (Electrically Erasable and Programmable Read Only Memory) 82, are written data of the subject distance and the respective focal lengths corresponding to the drive pulse numbers. A CPU 83 controls the rotation of the zoom motor 26, referring to the data of the EEPROM 82. Moreover, the CPU 83 controls the respective circuits sequentially.

Next, referring to the circuit shown in FIG. 15, an operation of the camera is described below. When the power supply switch 15 is turned on, the CPU checks a battery 84. In case a voltage of the battery 84 is low, a battery mark of the display 13 is blinked and continuing a photographing operation is prohibited. When the battery 84 is normal, the CPU 83 instructs the motor control circuit 79 to rotate the zoom motor 26. Then, the motor control circuit 79 rotates the zoom motor 26 to the home position HP1. During the rotation of the zoom motor 26, the counter 80 is reset when the position sensor 81 detects the original position. Just after that, the lens cover 40 is opened. Upon setting the focal length of the vari-focal lens apparatus to 35 mm, the motor control circuit 79 stops the zoom motor 26. After the zoom motor 26 has been stopped, charging the flash circuit 76 is started.

The mode selection switch 72 is handled to select the automatic flash mode, for example. Further, the T/W switch 14 is handled. In response to this, the CPU 83 rotates the zoom motor 26 via the motor control circuit 79 to advance the lens barrel for changing a focal point. In association with the change of the focal point, the step zoom viewfinder is operated to change the magnification of the viewfinder.

If handling the T/W switch 14 is stopped while the focal point is changed, the lens barrel is set to the nearest focal length. In this case, the CPU 83 reads out a count value of the counter 80 as a current value. Successively, the CPU 83 finds the pulse number of the home position of the nearest focal length as an objective value, referring to the data of the EEPROM 82. The CPU 83 sends data, which represents difference between the objective value and the current value, to the motor control circuit 79 to rotate the zoom motor 26 up to the objective value.

By the way, when the lens barrel is positioned within the focusing section, the lens barrel may be set to the home position of the corresponding focal length. Moreover, when the lens barrel is positioned within the focal-length changing section, the lens barrel may be set to the home position of the next focal length. Further, it is all right to change to the next focal length every handling of the T/W switch without regard to the handling time.

Composition of the subject is determined, watching through the step zoom viewfinder. After that, the release button 12 is depressed. The first release switch 73 is turned on by the half depression of the release button 12. The CPU 83 activates the distance measurement circuit 71 to measure the subject distance. Successively, the CPU 83 checks a charging state of the flash circuit 76, and performs additional charging when the charging voltage is low. Meanwhile, the photometry circuit 70 measures the brightness of the subject.

Upon full depression of the release button 12, the second release switch 73 is turned on. The CPU 83 confirms a position of the lens barrel from the value of the counter 80. Based on the measured distance, the pulse number of the nearest subject distance is found within the set focal length, referring the EEPROM 82. The zoom motor 26 is rotated to advance the lens barrel, and focusing is performed.

After stopping the lens barrel, the shutter device is operated so that the shutter blade 35 is opened and closed at a speed corresponding to the brightness of the subject. When the subject is dark, the flash circuit 76 is activated. After photographing, the motor control circuit 79 reverses the zoom motor 26 to return the lens barrel to the home position. Moreover, the film advancing motor 78 is rotated to advance the photo film by one frame. After that, charging the flash circuit 76 is started.

The CPU 83 has a built-in timer to measure a passing time from when the camera has been handled at last. When passage of five minutes is detected, the CPU 83 reverses the zoom motor 26 via the motor control circuit 79 to contain the lens barrel in the camera body 2. Since the camera takes a non-usage state, the CPU 83 is set in a sleep mode. In this case, the camera is prevented from being left in a state that a power supply is turned on. Thus, an electricity saving effect may be obtained.

Meanwhile, close-up photographing may be performed by utilizing a lens of a short-focal-point side. In this case, an aperture size (stop value) of the shutter is determined so as to obtain a proper exposure in accordance with the subject distance.

Although an advancing amount of the lens barrel is set to a designing value, a focus position of an actual product has an error due to its individual properties. In view of this, the pulse number corresponding to the focus position of each lens is not uniformly determined, and the focus position is actually measured on examination after assembling a camera. This measured value is written in the EEPROM 82 via the CPU 83 to correct the error of the focus position caused by the individual properties of the product.

Figure 16:
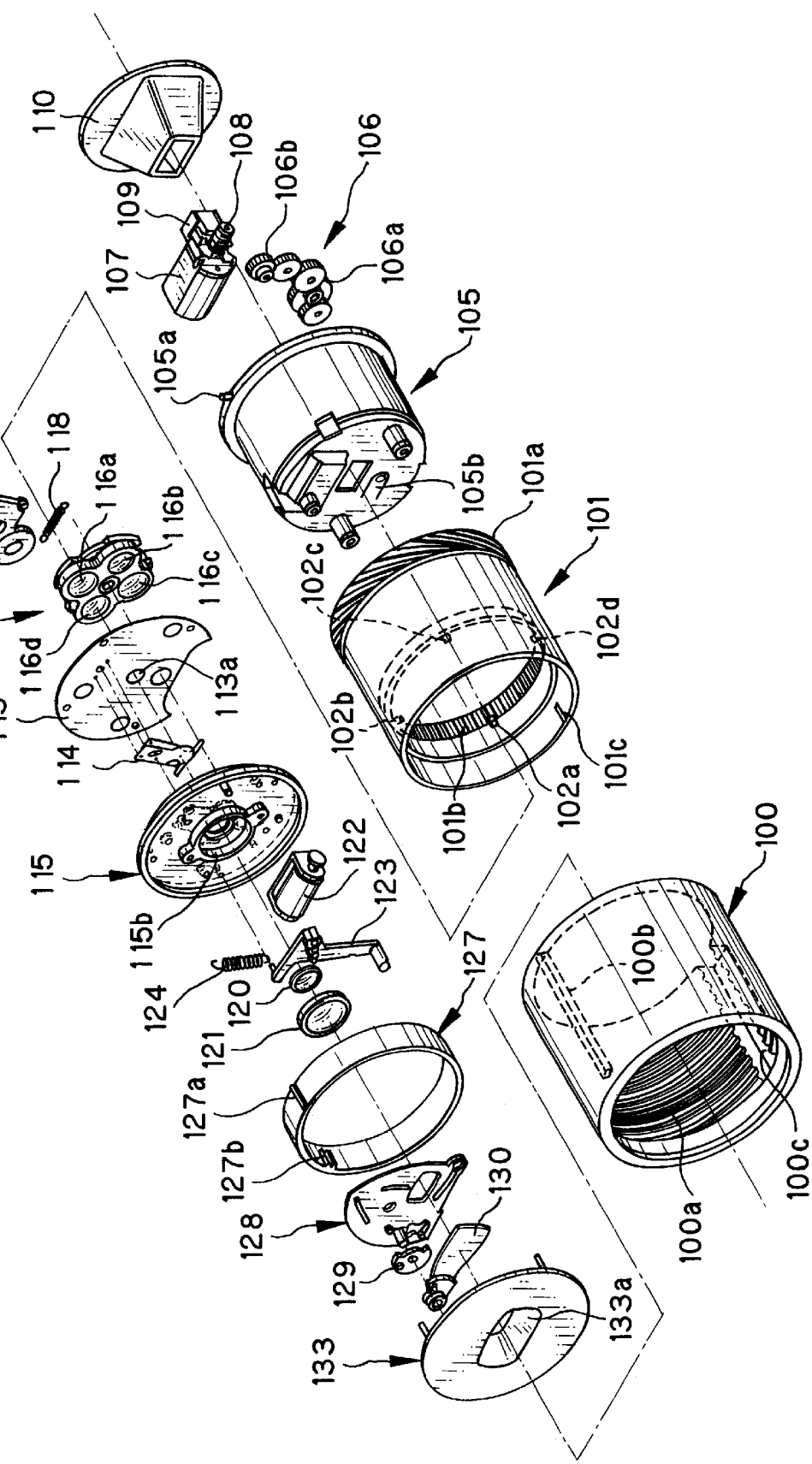
FIG. 16 is an exploded perspective view of the lens barrel showing another embodiment of the vari-focal lens apparatus.
Figure 17:
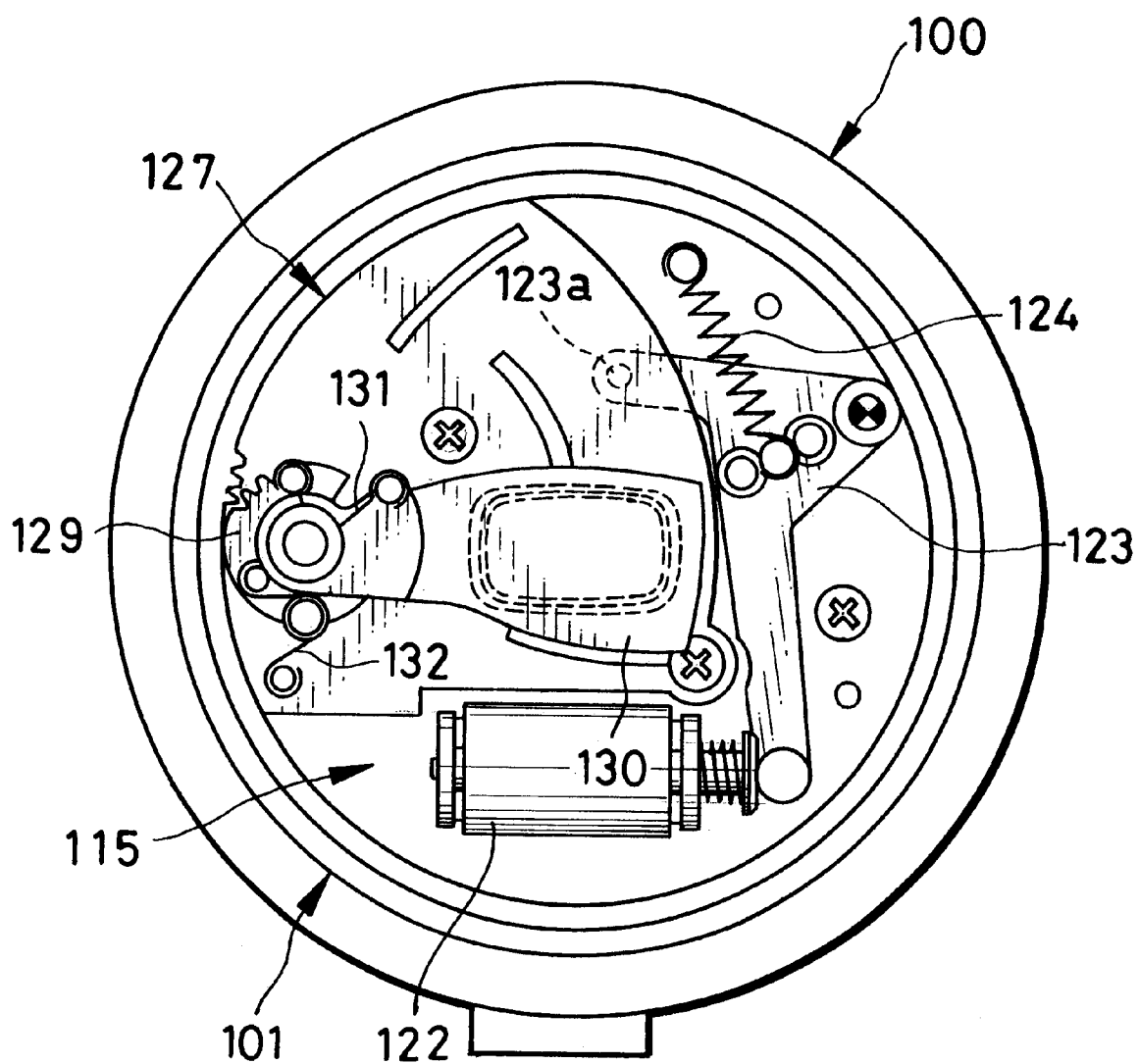
FIG. 17 is a front view of the lens barrel showing a shutter driving device and a lens cover.
Figure 18:
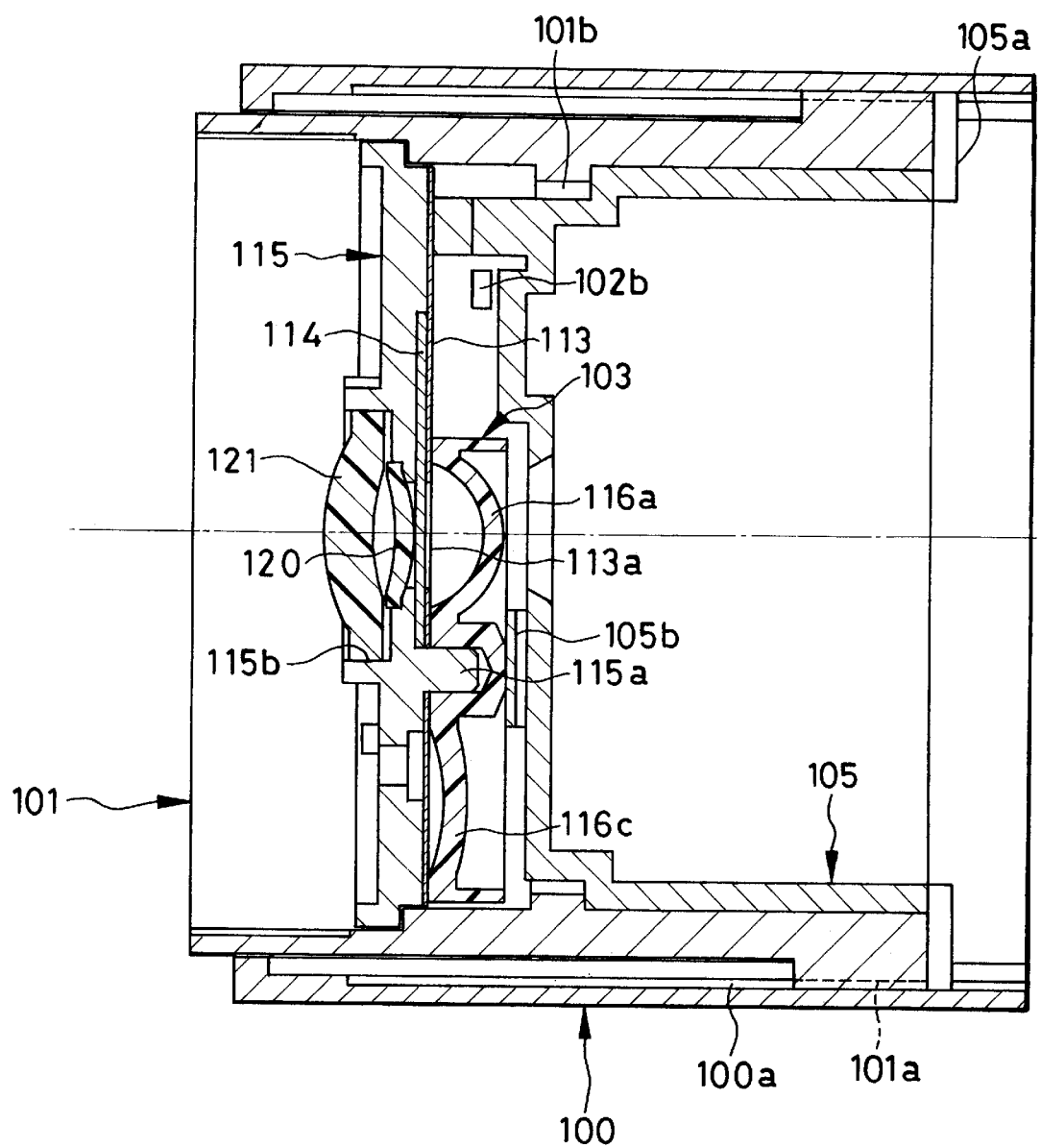
FIG. 18 is a partial section view of the lens barrel shown in FIG. 16.

FIGS. 16 through 18 show another embodiment according to the present invention. A fixed barrel 100 is provided with a helicoid 100a and straight grooves 100b and 100c, which are formed at the inside thereof. A first movable barrel 101 is provided with a helicoid 101a formed at the outside thereof and spirally engaging with the helicoid 100a of the fixed barrel 100. Moreover, a gear 101b is formed at the inside of the first movable barrel 101. Reference numerals 102a to 102d denote feed claws for rotating a lens turret 103.

A second movable barrel 105 is fitted into the first movable barrel 101, and a projection 105a for stopping a rotation enters the straight groove 100b of the fixed barrel 100. An output gear 106a of a reduction gear unit 106 meshes with the gear 101b. An input gear 106b of the reduction gear unit 106 meshes with a worm gear 108 of a zoom motor 107. As to the zoom motor 107, a DC motor is used. In order to detect a rotational position of the DC motor, an output shaft thereof is coupled with a rotary encoder 109 for outputting one pulse every rotation. The zoom motor 107 is attached to the second movable barrel 105. Reference numeral 110 denotes a hood.

Two shutter blades 114 is attached to a shutter board 113 fixed to a base disk 115. The lens turret 103 is disposed behind the shutter board 113 and is rotatably attached to a shaft 115a of the base disk 115. The lens turret 103 is pressed by a leaf spring 105b of the second movable barrel 105 so as not to slip out of the shaft 115a. The lens turret 103 comprises four lenses 116 to 116d having different focal lengths and integrally formed from a transparent plastic. reference numeral 117 denotes a lever for positioning the lens turret 103. Moreover, reference numeral 118 denotes a spring for pressing a roller 117a of the positioning lever 117 against the lens turret 103.

The base disk 115 is formed with a lens holder 115b located at the center thereof. Lenses 120 and 121 are attached to the interior of the lens holder 115b. Further, a solenoid 122 and a shutter drive lever 123 are also attached to the base disk 115. The solenoid 122 is for driving the shutter. The shutter drive lever 123 rotates in a counter-clockwise direction in FIG. 17 when an electric current flows in the solenoid 122. At this time, a pin 123a moves the pair of the shutter blades 114 in an opening direction. An electrifying period of the solenoid 122 is determined in accordance with the subject brightness. When the solenoid 122 is turned off, the shutter drive lever 123 is returned by a spring 124 to close the shutter blades 114.

A ring 127 is fitted into the first movable barrel 100. A protrusion 127a formed on a periphery of the ring 127 is inserted into a groove 110c of the first movable barrel 101. In virtue of this, the ring 127 is fixed to the first movable barrel 101. Meanwhile, the inside of the ring 127 is formed with a gear 127b having a few teeth.

A set plate 128 is attached to a front face of the base disk 115. The set plate 128 holds the lens 121. A sector gear 129 is rotatably attached to the set plate 128. A part of a lens cover 130 is fitted to a cutout of the sector gear 129. The lens cover 130 is integrally coupled with the sector gear 129 with a spring 131. When the first movable barrel 101 is evacuated and approaches the collapsible position, the sector gear 129 is rotated by the gear 127b of the ring 127 to move the lens cover 130 from an open position to a closed position. A toggle spring 132 is put on the lens cover 130. The toggle spring 132 urges the lens cover 130 toward either of the closed position and the open position in accordance with a position of the lens cover 130. Reference numeral 133 denotes a decorative cover having an orifice 133a and fixed to the base disk 115.

The vari-focal lens system of the second embodiment includes two groups constituted of three lenses. The front lens group is constituted of the two lenses 120 and 121. The rear lens group is constituted of a single lens. Changing the focal length is performed by the rear lens group. In virtue of this, the rotation of the lens turret is not prominent so that a strange feeling is not given to a photographer. Incidentally, an operation of the second embodiment is apparent from the first embodiment. For this reason, an explanation thereof is omitted.

Besides the camera in which the photo film is exchanged by a user, the present invention is applicable to a camera which is sold in a state that a photo film is contained in advance. Such camera is brought into a photo-printing shop with the photo film after photographing. Further, the present invention is also applicable to an electronic still camera.

The vari-focal lens system is not exclusive to the two groups constituted of two lenses or three lenses. For example, it is possible to employ two groups constituted of four lenses, three groups constituted of three lenses or four lenses, and so forth. In the forgoing embodiment, are used the rear lens group and the four front lens groups having four kinds of the focal length. However, the focal lengths may be two, three, five or more. Further, as disclosed in Japanese Utility Model Publication No. 2,538,987, a lens turret having three kinds of lenses may be used and a vari-focal lens system may include one group constituted of a single lens. With respect to such lens turret, it is preferable to provide a portion where a lens does not exist. This portion may be used as a substitute for a lens cover.

The lens turret is provided with the four lenses arranged at a predetermined pitch. However, the pitch between the respective lenses may be changed in accordance with the focal lengths of four lenses, for example. Moreover, it is not necessary to fix a pitch of four feed claws for rotating the lens turret. A length of the focusing section changes in accordance with the pitch between the lenses and the pitch between the feed claws. Thus, these pitches are determined in consideration of a step number for focusing relative to the respective focal length.

The periphery of the lens turret may be provided with a gear, and the lens turret may be intermittently rotated by one-tooth gears which are formed at four positions of the first movable barrel. Positioning the lens turret can be performed by a click mechanism comprising a notch and a click ball, a ratchet claw mechanism, an electromagnet mechanism comprising a solenoid, and so forth. Further, the lens turret may be rotated by an exclusive motor rotating in accordance with a position of the lens barrel. Furthermore, in a low-priced camera, the zoom motor may be omitted and the first movable barrel may be manually rotated.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A vari-focal lens apparatus comprising:
   a lens barrel moving by a predetermined stroke along an optical axis, said stroke including a plurality of focal-length changing sections and a plurality of focusing sections;

a lens turret rotatably disposed in said lens barrel and including a plurality of main lens groups having different focal lengths, said main lens groups being concentrically arranged;

focal-length changing means for intermittently rotating said lens turret, in order to set one of said main lens groups at said optical axis by turn, when said lens barrel passes through said focal-length changing section; and positioning means for preventing a rotation of said lens turret during focusing such that said lens turret goes straight along said optical axis together with said lens barrel without rotating within said focusing section.

2. A vari-focal lens apparatus according to claim 1, wherein said lens barrel comprises:

a fixed barrel;

a first movable barrel coupled with said fixed barrel in a helicoid manner, and rotating to move in an optical axis direction; and a second movable barrel moving, without rotating, in the optical axis direction in accordance with said first moving barrel, said lens turret being attached to said second movable barrel.

3. A vari-focal lens apparatus according to claim 2, further comprising:

a motor attached to said second movable barrel, said motor rotating said first movable barrel.

4. A vari-focal lens apparatus according to claim 3, further comprising:

at least one sub-lens attached to said second movable barrel, said sub-lens being disposed in front of or behind said lens turret.

5. A vari-focal lens apparatus according to claim 4, further comprising:

a shutter blade disposed between said lens turret and said sub-lens.

6. A vari-focal lens apparatus according to claim 5, wherein said sub-lens is a meniscus lens whose concave face is directed toward said shutter blade.

7. A vari-focal lens apparatus according to claim 2, wherein a number of said main lens groups is three or more, and each of said main lens groups has a single lens element.

8. A vari-focal lens apparatus according to claim 7, wherein said respective lens elements are integrally formed from a transparent plastic together with said lens turret.

9. A vari-focal lens apparatus according to claim 3, wherein said motor rotates said first movable barrel to intermittently rotate said lens turret while the focal length is changed, and after one of said main lens groups has been set at the optical axis, said first movable barrel is stopped to be rotated.

10. A vari-focal lens apparatus according to claim 9, wherein said first movable barrel is stopped, after changing the focal length, at a position which exceeds an infinity position focusing on infinity.

11. A vari-focal lens apparatus according to claim 9, wherein a start of said focusing section is a home position, said first movable barrel moving from said home position toward a finish of said focusing section while focusing is performed, and after photographing, said first movable barrel being returned.

12. A vari-focal lens apparatus according to claim 11, wherein said home position focuses on the farthest distance and said finish focuses on the near distance.

13. A vari-focal lens apparatus according to claim 12, wherein said focal-length changing means comprises:

a plurality of projections provided on said lens turret having a rotational center at a position being identical with or different from said second movable barrel; and a plurality of feed claws formed on an inner face of said first movable barrel, said feed claw pushing one of said projections to intermittently rotate said lens turret.

14. A vari-focal lens apparatus according to claim 13, wherein said positioning means comprises:

a cam portion provided on said lens turret and for positioning, said cam portion correctly locating said main lens group at a position corresponding to the optical axis;

a lever urged toward said lens turret; and a roller attached to said lever and abutting on said cam portion for positioning.

15. A vari-focal lens apparatus according to claim 14, wherein said lever gives, to a lens holder, drive force for rotating said lens turret to a correct position when said lens turret becomes free by disengaging said feed claw from said projection.

16. A vari-focal lens apparatus according to claim 15, further comprising:

a reduction mechanism having a worm and a worm wheel, rotational force of said motor being transmitted to said first movable barrel via said reduction mechanism.

17. A vari-focal lens apparatus according to claim 16, further comprising:

an EEPROM in which a rotational amount of said motor within said focusing section is written, further, measurement data obtained by measuring a focused distance corresponding to said rotational amount is also written.

18. A vari-focal lens apparatus according to claim 17, wherein said motor is automatically rotated to contain said first movable barrel in said fixed barrel in case a non-operation state continues for a predetermined period.

19. A vari-focal lens apparatus according to claim 18, further comprising:

means for measuring said rotational amount of said motor in order to specify a position of said first movable barrel within the stroke.

20. A vari-focal lens apparatus according to claim 19, wherein said rotational-amount measuring means is a counter for counting a pulse, and said motor is a stepping motor or a DC motor having an encoder.

21. A camera having a vari-focal lens apparatus in which a focal length of a taking lens is variable, said vari-focal lens apparatus comprising:

a fixed barrel;

a first movable barrel coupled with said fixed barrel in a helicoid manner, and rotating in said fixed barrel to move in an optical axis direction, said first movable barrel being rotated by a predetermined stroke within one rotation, and said stroke including a plurality of focal-length changing sections and a plurality of focusing sections;

a second movable barrel disposed in said first movable barrel and moving in the optical axis direction together with said first movable barrel, said second movable barrel being prevented from rotating by a guide of said fixed barrel;

a lens turret rotatably disposed in said second movable barrel and including a plurality of main lens groups having different focal lengths, said main lens groups being concentrically arranged;

focal-length changing means for intermittently rotating said lens turret, in order to change the focal length of said taking lens by setting one of said main lens groups at said optical axis by turn, when said first movable barrel passes through said focal-length changing section; and positioning means for preventing a rotation of said lens turret during focusing such that said lens turret goes straight along said optical axis together with said second movable barrel without rotating within said focusing section.

22. A camera according to claim 21, further comprising:

a motor attached to said second movable barrel, said motor rotating said first movable barrel.

23. A camera according to claim 22, further comprising:

a viewfinder optical system including at least one movable lens;

a lens holder for holding said movable lens and moving in an optical axis direction of said viewfinder optical system to change a viewfinder magnification;

a cylinder cam having a first cam groove and a second cam groove;

a projection provided on said second movable barrel, said projection being fitted into said first cam groove and moving said cylinder cam when said second movable barrel goes straight along said optical axis; and a cam pin provided on said lens holder, said cam pin being fitted into said second cam groove and moving said movable lens via said lens holder to change said viewfinder magnification in accordance with said focal length of said taking lens.

24. A camera according to claim 22, wherein said second cam groove has pause sections extending in a circumferential direction of said cylinder cam and a slanted section for connecting said pause sections, when said cam pin enters said pause section, said lens holder being stopped even if said cylinder cam rotates, and said lens holder being moved by rotating said cylinder cam when said cam pin enters said slanted section.

* * * * *

UNITED STATES PATENT AND TRADEMARK OFFICE
CERTIFICATE OF CORRECTION

PATENT NO.   : 6,501,909 B1
DATED        : December 31, 2002
INVENTOR(S)  : Takashi Nishimura et al.

It is certified that error appears in the above-identified patent and that said Letters Patent is hereby corrected as shown below:

<u>Title page,</u>
Please add Item -- [73] S.I.T. CO., LTD., Kanagawa, Japan --.

Signed and Sealed this

Twentieth Day of May, 2003

JAMES E. ROGAN
*Director of the United States Patent and Trademark Office*